(12) United States Patent
Philyaw et al.

(10) Patent No.: US 7,370,114 B1
(45) Date of Patent: May 6, 2008

(54) SOFTWARE DOWNLOADING USING A TELEVISION BROADCAST CHANNEL

(75) Inventors: Jeffry Jovan Philyaw, Dallas, TX (US); David Kent Mathews, Carrollton, TX (US)

(73) Assignee: LV Partners, L.P., Dallas, TX (US)

( * ) Notice: Subject to any disclaimer, the term of this patent is extended or adjusted under 35 U.S.C. 154(b) by 0 days.

(21) Appl. No.: 09/417,863

(22) Filed: Oct. 13, 1999

Related U.S. Application Data

(63) Continuation-in-part of application No. 09/151,530, filed on Sep. 11, 1998, now Pat. No. 6,098,106.

(51) Int. Cl.
*G06F 15/16* (2006.01)
*G06F 9/44* (2006.01)
*H04N 7/173* (2006.01)

(52) U.S. Cl. .................. 709/231; 717/172; 725/97; 725/121

(58) Field of Classification Search ............... 709/221, 709/220, 231; 725/152, 140, 132, 50, 97, 725/121; 717/172
See application file for complete search history.

(56) References Cited

U.S. PATENT DOCUMENTS

| | | | |
|---|---|---|---|
| 3,668,312 A | 6/1972 | Yamamoto et al. | 348/17 |
| 4,002,886 A | 1/1977 | Sundelin | 235/61.7 R |
| 4,042,792 A | 8/1977 | Pakenham et al. | 179/90 |
| 4,365,148 A | 12/1982 | Whitney | 235/383 |
| 4,621,259 A | 11/1986 | Schepers et al. | 345/180 |
| 4,654,482 A | 3/1987 | DeAngelis | 379/95 |
| 4,780,599 A | 10/1988 | Baus | 235/383 |
| 4,785,296 A | 11/1988 | Tabata et al. | 340/731 |
| 4,816,904 A | 3/1989 | McKenna et al. | 348/13 |

(Continued)

FOREIGN PATENT DOCUMENTS

EP  0 399 200 A2  4/1990

(Continued)

OTHER PUBLICATIONS

"Group Decision Support System: Development and Application", Energy Systems, Westinghouse, Pittsburgh, PA.

(Continued)

*Primary Examiner*—Andrew Caldwell
*Assistant Examiner*—Douglas B Blair
(74) *Attorney, Agent, or Firm*—Howison & Arnott, L.L.P.

(57) ABSTRACT

A software distribution architecture having a television broadcast system as its infrastructure. Software from a software repository (1600) is mixed into a television broadcast system and transmitted into one or more selected channels at prescribed dates and times. An at-home subscriber, capable of receiving with a receiver (1608) the one or more select channels, switches to the one or more channels carrying the software distribution with a channel selector (1611). The subscriber, having programmed a controller (1616) with a programmer (1620) for the date, time, software ID, and channel of the software broadcast, then downloads the software package to a storage device (1622) for ultimate transfer to a PC (1624). A validation and accounting system (1628) then records the software download transaction and transmits this information over a PSTN (1632) to a provider accounting system (1630) such that the subscriber is billed for the software package which was downloaded.

30 Claims, 11 Drawing Sheets

U.S. PATENT DOCUMENTS

| | | | |
|---|---|---|---|
| 4,817,136 A | 3/1989 | Rhoads | 379/375 |
| 4,833,308 A | 5/1989 | Humble | 235/383 |
| 4,841,132 A | 6/1989 | Kajitani et al. | 235/472 |
| 4,845,634 A | 7/1989 | Vitek et al. | 364/468 |
| 4,894,789 A | 1/1990 | Yee | 348/552 |
| 4,899,370 A | 2/1990 | Kameo et al. | 379/104 |
| 4,901,073 A | 2/1990 | Kibrick | 341/13 |
| 4,905,094 A | 2/1990 | Pocock et al. | 386/106 |
| 4,907,264 A | 3/1990 | Seiler et al. | 379/216 |
| 4,916,293 A | 4/1990 | Cartlidge et al. | 235/375 |
| 4,937,853 A | 6/1990 | Brule et al. | 379/91 |
| 4,947,028 A | 8/1990 | Gorog | 235/380 |
| 4,959,530 A | 9/1990 | O'Connor | 235/383 |
| 4,975,948 A | 12/1990 | Andresen et al. | 379/355 |
| 4,984,155 A | 1/1991 | Geier et al. | 364/401 |
| 5,003,384 A * | 3/1991 | Durden et al. | 725/104 |
| 5,038,023 A | 8/1991 | Saliga | 235/385 |
| 5,054,096 A | 10/1991 | Beizer | 382/41 |
| 5,088,045 A | 2/1992 | Shimanaka et al. | 364/468 |
| 5,111,391 A | 5/1992 | Fields et al. | 364/401 |
| 5,115,326 A | 5/1992 | Burgess et al. | 358/440 |
| 5,128,752 A | 7/1992 | Von Kohorn | 358/84 |
| 5,144,654 A | 9/1992 | Kelley et al. | 379/356 |
| 5,161,037 A | 11/1992 | Saito | 358/468 |
| 5,161,214 A | 11/1992 | Addink et al. | 395/145 |
| 5,182,705 A | 1/1993 | Barr et al. | 364/401 |
| 5,189,630 A | 2/1993 | Barstow et al. | 364/514 |
| 5,191,525 A | 3/1993 | LeBrun et al. | 364/419 |
| 5,198,644 A | 3/1993 | Pfeiffer et al. | 235/383 |
| 5,235,654 A | 8/1993 | Anderson et al. | 382/61 |
| 5,241,402 A | 8/1993 | Aboujaoude et al. | 358/406 |
| 5,243,531 A | 9/1993 | DiPippo et al. | 364/468 |
| 5,247,347 A | 9/1993 | Litteral et al. | 348/7 |
| 5,262,860 A | 11/1993 | Fitzpatrick et al. | 348/461 |
| 5,285,278 A | 2/1994 | Holman | 348/10 |
| 5,287,181 A | 2/1994 | Holman | 348/473 |
| 5,288,976 A | 2/1994 | Citron et al. | 235/375 |
| 5,296,688 A | 3/1994 | Hamilton et al. | 235/375 |
| 5,304,786 A | 4/1994 | Pavlidis et al. | 235/462 |
| 5,305,195 A | 4/1994 | Murphy | 705/1 |
| 5,319,454 A | 6/1994 | Schutte | 348/5.5 |
| 5,324,922 A | 6/1994 | Roberts | 235/375 |
| 5,331,547 A | 7/1994 | Laszlo | 364/413.01 |
| 5,340,966 A | 8/1994 | Morimoto | 235/376 |
| 5,357,276 A | 10/1994 | Banker et al. | 348/7 |
| 5,362,948 A | 11/1994 | Morimoto | 235/376 |
| 5,382,779 A | 1/1995 | Gupta | 235/383 |
| 5,386,298 A | 1/1995 | Bronnenberg et al. | 358/403 |
| 5,398,336 A | 3/1995 | Tantry et al. | 395/600 |
| 5,405,232 A | 4/1995 | Lloyd et al. | 414/280 |
| 5,418,713 A | 5/1995 | Allen | 364/403 |
| 5,420,403 A | 5/1995 | Allum et al. | 235/375 |
| 5,420,943 A | 5/1995 | Mak | 382/313 |
| 5,424,524 A | 6/1995 | Ruppert et al. | 235/462 |
| 5,438,355 A | 8/1995 | Palmer | 348/1 |
| 5,446,490 A | 8/1995 | Blahut et al. | 348/7 |
| 5,446,919 A | 8/1995 | Wilkins | 455/6.2 |
| 5,491,508 A | 2/1996 | Friedell et al. | 348/16 |
| 5,493,107 A | 2/1996 | Gupta et al. | 235/383 |
| 5,519,878 A | 5/1996 | Dolin, Jr. | 395/800 |
| 5,530,852 A | 6/1996 | Meske, Jr. et al. | 396/600 |
| 5,570,295 A | 10/1996 | Isenberg et al. | 379/90.01 |
| 5,572,643 A | 11/1996 | Judson | 395/793 |
| 5,592,551 A | 1/1997 | Lett et al. | 380/20 |
| 5,594,226 A | 1/1997 | Steger | 235/379 |
| 5,602,377 A | 2/1997 | Beller et al. | 235/462 |
| 5,604,542 A | 2/1997 | Dedrick | 348/552 |
| 5,640,193 A | 6/1997 | Wellner | 348/7 |
| 5,649,186 A | 7/1997 | Ferguson | 395/610 |
| 5,664,110 A | 9/1997 | Green et al. | 705/26 |
| 5,666,293 A * | 9/1997 | Metz et al. | 709/220 |
| 5,671,282 A | 9/1997 | Wolff et al. | 380/25 |
| 5,675,721 A | 10/1997 | Freedman et al. | 395/129 |
| 5,682,540 A | 10/1997 | Klotz, Jr. et al. | 395/766 |
| 5,694,163 A | 12/1997 | Harrison | 348/13 |
| 5,708,780 A | 1/1998 | Levergood et al. | 709/229 |
| 5,710,887 A | 1/1998 | Chelliah et al. | 395/226 |
| 5,715,314 A | 2/1998 | Payne et al. | 705/78 |
| 5,724,424 A | 3/1998 | Gifford | 705/79 |
| 5,745,681 A | 4/1998 | Levine et al. | 395/200.3 |
| 5,754,906 A | 5/1998 | Yoshida | 396/448 |
| 5,757,917 A | 5/1998 | Rose et al. | 380/25 |
| 5,761,606 A | 6/1998 | Wolzien | 455/6.2 |
| 5,764,906 A | 6/1998 | Edelstein et al. | 395/200.49 |
| 5,765,176 A | 6/1998 | Bloomberg | 707/514 |
| 5,768,528 A | 6/1998 | Stumm | 709/231 |
| 5,768,539 A * | 6/1998 | Metz et al. | 709/249 |
| 5,774,664 A | 6/1998 | Hidary et al. | 395/200 |
| 5,774,870 A | 6/1998 | Storey | 705/14 |
| 5,778,367 A | 7/1998 | Wesinger, Jr. et al. | 707/10 |
| 5,790,793 A | 8/1998 | Higley | 709/218 |
| 5,791,991 A | 8/1998 | Small | 463/41 |
| 5,794,210 A | 8/1998 | Goldhaber et al. | 705/14 |
| 5,796,952 A | 8/1998 | Davis et al. | 305/200.54 |
| 5,804,803 A | 9/1998 | Cragun et al. | 235/375 |
| 5,815,776 A | 9/1998 | Nukada | 399/174 |
| 5,832,223 A | 11/1998 | Hara et al. | 395/200.47 |
| 5,833,468 A | 11/1998 | Guy et al. | 434/350 |
| 5,848,202 A | 12/1998 | D'Eri et al. | 382/306 |
| 5,848,413 A | 12/1998 | Wolff | 707/10 |
| 5,854,897 A | 12/1998 | Radziewicz et al. | 709/224 |
| 5,864,823 A | 1/1999 | Levitan | 105/14 |
| 5,869,819 A | 2/1999 | Knowles et al. | 235/375 |
| 5,894,516 A * | 4/1999 | Brandenburg | 705/51 |
| 5,905,248 A | 5/1999 | Russell et al. | 235/462 |
| 5,905,251 A | 5/1999 | Knowles | 235/472.01 |
| 5,905,665 A | 5/1999 | Rim | 364/746 |
| 5,905,865 A | 5/1999 | Palmer et al. | 395/200.47 |
| 5,907,793 A | 5/1999 | Reams | 455/3.1 |
| 5,913,210 A | 6/1999 | Call | 707/4 |
| 5,915,090 A | 6/1999 | Joseph et al. | 709/202 |
| 5,918,214 A | 6/1999 | Perkowski | 705/27 |
| 5,925,865 A | 7/1999 | Steger | 235/379 |
| 5,929,850 A | 7/1999 | Broadwin et al. | 345/327 |
| 5,932,863 A | 8/1999 | Rathus et al. | 235/462.15 |
| 5,933,829 A | 8/1999 | Durst et al. | 707/10 |
| 5,935,004 A * | 8/1999 | Tarr et al. | 463/40 |
| 5,948,061 A | 9/1999 | Merriman et al. | 709/219 |
| 5,951,639 A | 9/1999 | MacInnis | |
| 5,957,695 A | 9/1999 | Redford et al. | 434/307 R |
| 5,960,411 A | 9/1999 | Hartman et al. | 705/26 |
| 5,961,603 A | 10/1999 | Kunkel et al. | 709/229 |
| 5,970,471 A | 10/1999 | Hill | 705/26 |
| 5,970,472 A | 10/1999 | Allsop et al. | 705/26 |
| 5,971,277 A | 10/1999 | Cragun et al. | 235/462.01 |
| 5,974,443 A | 10/1999 | Jeske | 709/202 |
| 5,974,451 A | 10/1999 | Simmons | 709/218 |
| 5,976,833 A | 11/1999 | Furukawa et al. | 435/69.1 |
| 5,978,773 A | 11/1999 | Hudetz et al. | 709/219 |
| 5,991,739 A | 11/1999 | Cupps et al. | 705/26 |
| 5,992,752 A | 11/1999 | Wilz, Sr. et al. | 235/472.01 |
| 5,995,105 A | 11/1999 | Reber et al. | 345/356 |
| 6,002,394 A | 12/1999 | Schein et al. | 345/327 |
| 6,002,852 A * | 12/1999 | Birdwell et al. | 709/203 |
| 6,003,073 A | 12/1999 | Solvason | 709/219 |
| 6,006,257 A | 12/1999 | Slezak | 709/219 |
| 6,009,274 A * | 12/1999 | Fletcher et al. | 717/173 |
| 6,009,410 A | 12/1999 | LeMole et al. | 709/219 |
| 6,009,465 A | 12/1999 | Decker et al. | 709/219 |
| 6,012,102 A | 1/2000 | Shachar | 710/5 |
| 6,018,764 A | 1/2000 | Field et al. | 709/217 |
| 6,049,539 A | 4/2000 | Lee et al. | 370/355 |
| 6,064,979 A | 5/2000 | Perkowski | 705/26 |
| 6,108,656 A | 8/2000 | Durst et al. | 707/10 |

| | | | | |
|---|---|---|---|---|
| 6,238,290 B1 * | 5/2001 | Tarr et al. | ............... | 463/40 |
| 6,317,885 B1 * | 11/2001 | Fries | ............... | 725/109 |
| 6,330,715 B1 * | 12/2001 | Razzaghe-Ashrafi | ............... | 717/171 |
| 6,377,690 B1 * | 4/2002 | Witschorik | ............... | 380/268 |
| 6,427,238 B1 * | 7/2002 | Goodman et al. | ............... | 725/136 |
| 6,741,574 B2 * | 5/2004 | Arsenault | ............... | 370/316 |
| 6,823,366 B1 * | 11/2004 | Nakano | ............... | 709/206 |
| 6,990,680 B1 * | 1/2006 | Wugofski | ............... | 725/58 |

FOREIGN PATENT DOCUMENTS

| | | |
|---|---|---|
| EP | 0 905 984 A2 | 9/1998 |
| EP | 0 961 250 A2 | 12/1999 |
| JP | 10188140 A | 12/1996 |
| WO | WO 95/10813 | 4/1995 |
| WO | WO 96/07146 | 3/1996 |
| WO | WO 97/37319 | 2/1997 |
| WO | WO 98/03923 | 1/1998 |
| WO | WO 98/06055 | 2/1998 |
| WO | WO 98/09243 | 3/1998 |
| WO | WO 98/19259 | 5/1998 |
| WO | WO 98/40823 | 9/1998 |
| WO | WO 99/63457 | 6/1999 |

OTHER PUBLICATIONS

"New Technologies in Credit Card Authentication", Pieter de Bryne, Institute for Communications Technology, Zurich, Switzerland.

"AVITAL, a Private Teaching System by Fax Communication", Atsusji Iizawa, Noriro Sugiki, Yukari Shitora and Hideko Kunii, Software Research Center, Tokyo, Japan.

"Document on Computer" USPS Technical Support Center, Norman, OK.

"Development of a Commercially Successful Wearable Data Collection System", Symbol Technologies, Inc.

What do forward looking companies consider in their plans and developments?, A.G. Johnston, Nestle.

"The Automation Synergy", Neves and Noivo, Portugal.

"Integration of Hand-Written Address Interpretation Technology into the United States Postal Service Remote Computer Reader System", Srihari (Cedar, Suny at Buffalo) and Kueberg (U.S. Postal Service, VA).

"Paper Based Document Security—A Review", van Renesse, TNO Institute of Applied Physics, The Netherlands.

"IEEE Standard for Bar Coding for Distribution Transformers" Transformers Committee of the IEEE Power Engineering Society, The Institute of Electrical and Electronics Engineers, Inc. NY.

"The Stylus™-Shopping from Home", STYLUS Innovation, MA.

"Distributing Uniform Resource Locators as Bar Code Images", IBM Technical Disclosure Bulleting, Jan. 1996.

"Bar Code Method for Automating Catalog Orders", IBM Technical Disclosure Bulletin, Sep. 1998.

"Bar-Code Recognition System Using Image Processing", Kuroki, Yoneoka et al., Hitachi Research Laborator.

"Group Decision Support System: Development and Application", Energy Systems, Westinghouse, Pittsburgh, PA, no date.

"New Technologies in Credit Card Authentication", Pieter de Bryne, Institute for Communications Technology, Zurich, Switzerland, no date.

"AVITAL, a Private Teaching System by Fax Communication", Atsusji Iizawa, Noriro Sugiki, Yukari Shitora and Hideko Kunii, Software Research Center, Tokyo, Japan, no date.

"Document on Computer" USPS Technical Support Center, Norman, OK, no date.

"Development of a Commercially Successful Wearable Data Collection System", Symbol Technologies, Inc., no date.

What do forward looking companies consider in their plans and developments?, A.G. Johnston, Nestle, no date.

"The Automation Synergy", Neves and Noivo, Portugal, no date.

"Integration of Hand-Written Address Interpretation Technology into the United States Postal Service Remote Computer Reader System", Srihari (Cedar, Suny at Buffalo) and Kueberg (U.S. Postal Service, VA), no date.

"Paper Based Document Security—A Review", van Renesse, TNO Institute of Applied Physics, The Netherlands, no date.

"IEEE Standard for Bar Coding for Distribution Transformers" Transformers Committee of the IEEE Power Engineering Society, The Institute of Electrical and Electronics Engineers, Inc. NY, no date.

"The Stylus™-Shopping from Home", STYLUS Innovation, MA, no date.

"Bar-Code Recognition System Using Image Processing", Kuroki, Yoneoka et al., Hitachi Research Laborator, no date.

* cited by examiner

PATH A: SOURCE TO ARS

PATH B: ARS TO SOURCE

PATH C: SOURCE TO ADVERTISER

PATH D: ADVERTISER TO SOURCE

PATH E: ARS TO ADVERTISER (OPTIONAL)

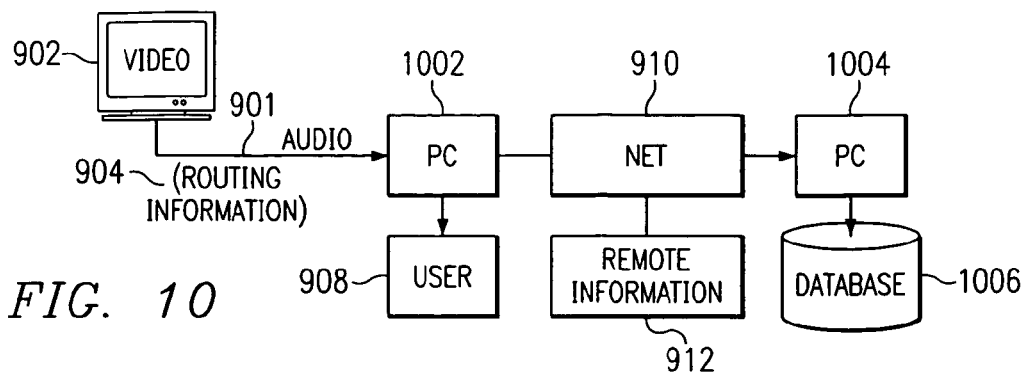
FIG. 10
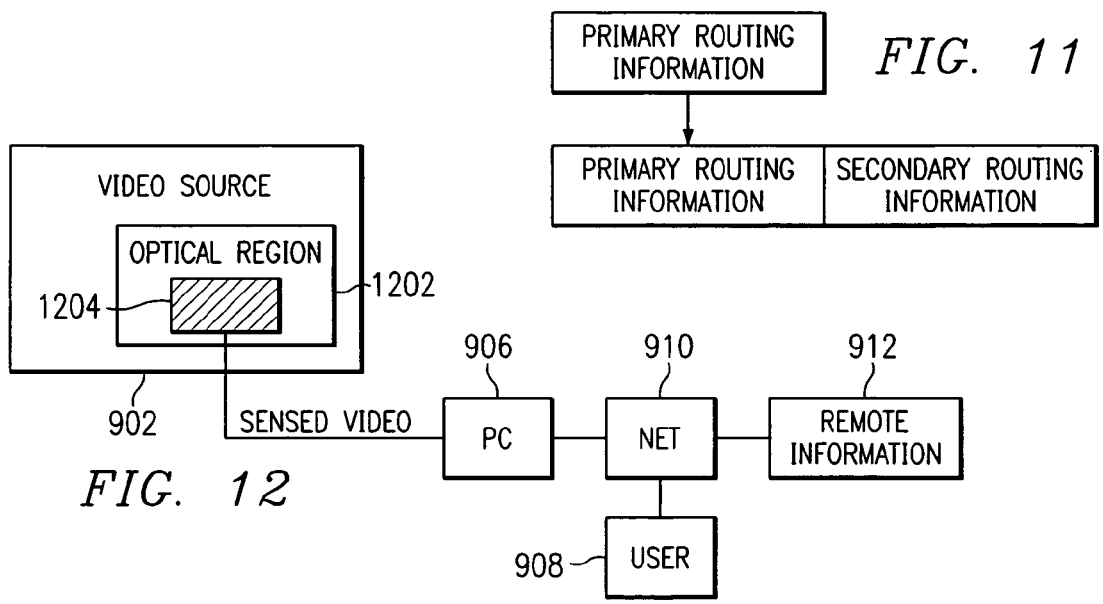
FIG. 11
FIG. 12
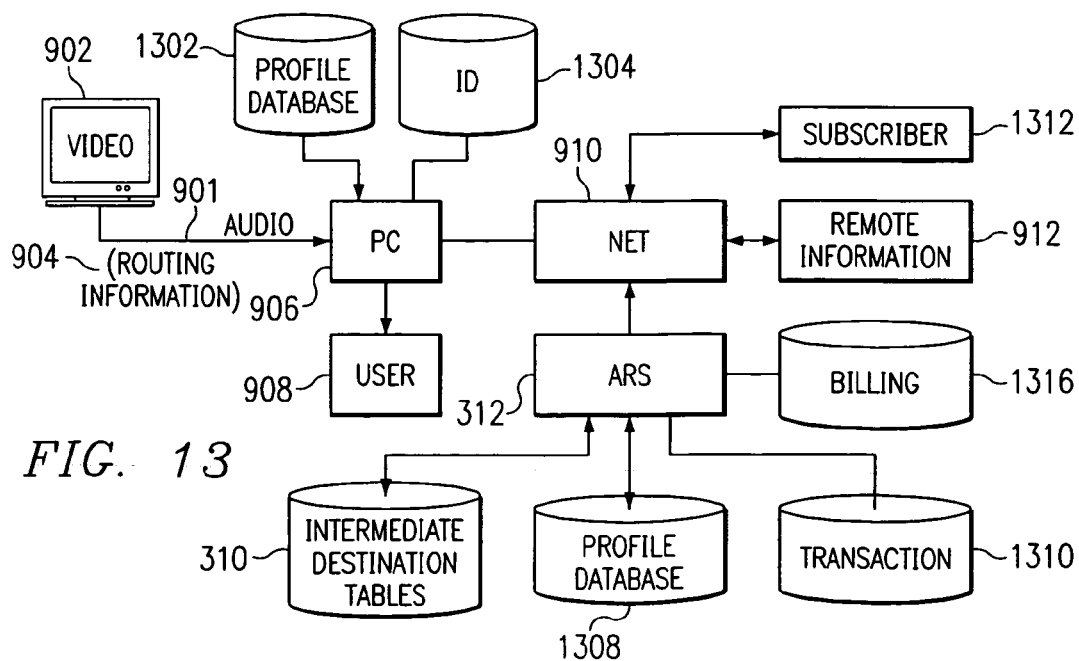
FIG. 13

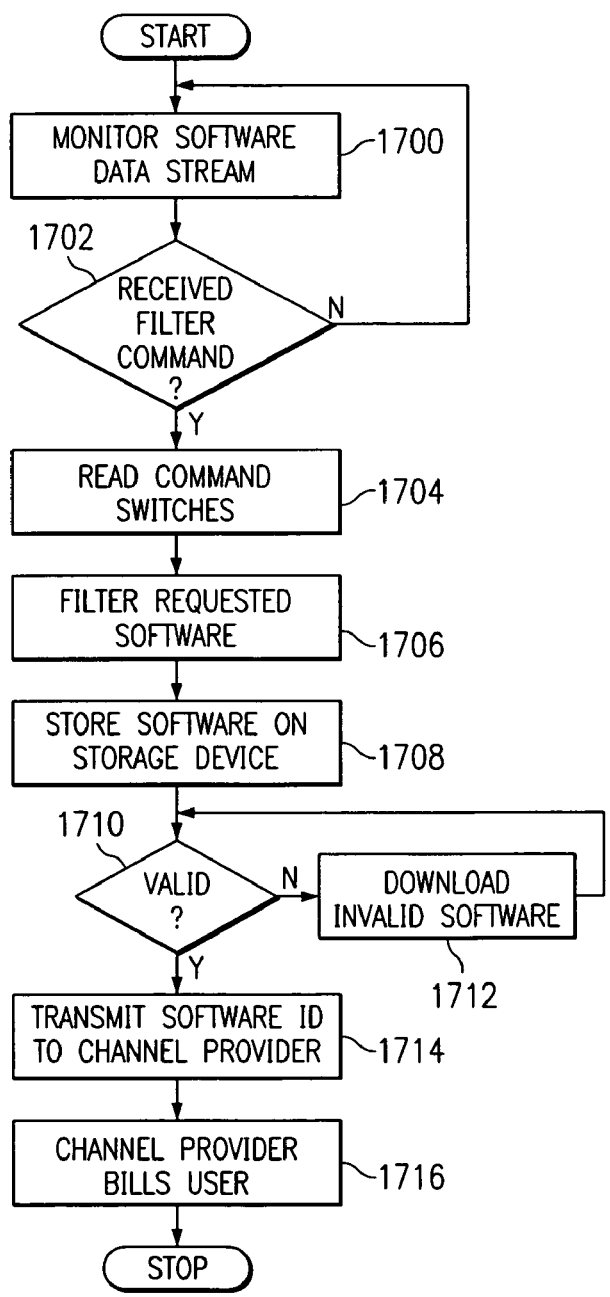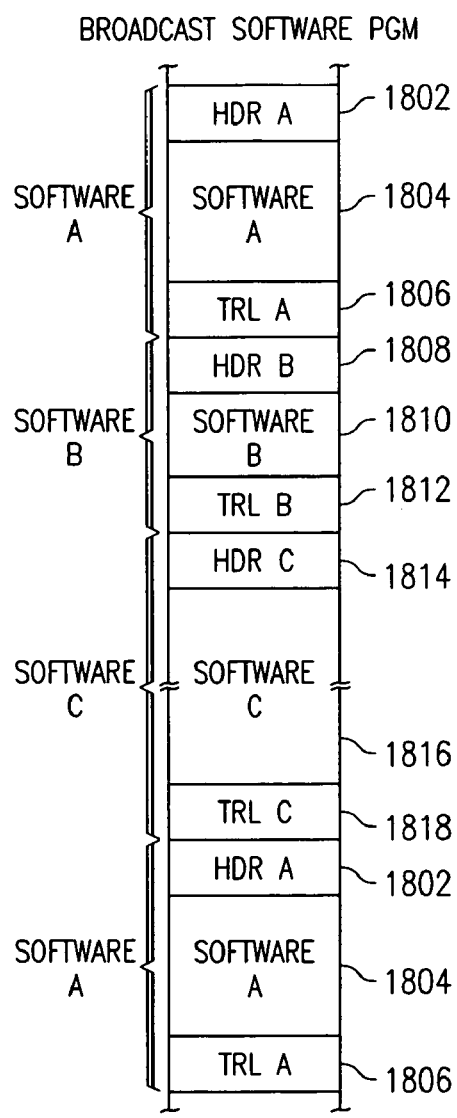

SOFTWARE DOWNLOADING USING A TELEVISION BROADCAST CHANNEL

CROSS REFERENCE TO RELATED APPLICATION

This application is a Continuation-in-Part of U.S. patent application Ser. No. 09/151,530, entitled "METHOD FOR CONTROLLING A COMPUTER WITH AN AUDIO SIGNAL," filed on Sep. 11, 1998, and which has now issued on Aug. 1, 2000, as U.S. Pat. No. 6,098,106.

TECHNICAL FIELD OF THE INVENTION

This invention is related to a method for downloading software using a television broadcast channel.

BACKGROUND OF THE INVENTION

With the enormous number of users connecting online to access a wide variety of products and services, network bandwidth is becoming a limiting factor in providing these products and services. The typical connection mode for home users is a 56K analog modem which is sufficient for surfing various web sites of interest by the user but is becoming increasingly prohibitive for network traffic that comprises streaming audio, video and lengthy file downloads. Conventional software distribution methods include providing hard copy manuals and distribution media such as floppy diskettes, and more recently, compact disks (CDs) which contain the software application files and electronic versions of the manuals.

More recently, vendors have moved to offering for purchase software applications and electronic manuals by direct download from vendor websites over a global communication network (commonly known as the Internet). This introduces enormous cost savings for the vendor by eliminating any paper costs, distribution costs, and media costs incurred by conventional methods of distribution. However, this method of distribution is very time consuming for a user who has a low bandwidth analog connection (e.g., 33K and 56K) and can even be prohibitive for those who have the more recent digital connections such as digital subscriber line (DSL) and cable modems which operate in the megabyte download regime. For example, where operating systems or application bundles contain many applications, the file sizes can approach 500 megabytes or more. Download of a file this size using a 56K modem will take many hours at best, and ties up the user's telephone line, if they have only the single telephone line to connect to the network. Furthermore, the download process can be interrupted by any number of causes such as power interruptions, connection problems, etc., making such a download prospect tedious, if not nearly impossible. Therefore such massive downloads, as seems to be the current trend in software distribution, may very well be prohibitive for most users having analog connections, and even those coming online today in the presence of newer and more faster connection technologies such as DSL and cable modems.

Another headache related to existing on-line distribution methods is that vendor servers can handle only a fixed number of users who are accessing the server for a download. Therefore, users must "stand in line" to gain access to the server in order to initiate a lengthy download of the software. Thus distribution of one or more applications on the same server or even dedicated application distribution servers can be a tedious process for the user and impacting customer relations with the vendor.

Current on-line payment methods also are not well established to where the customer believes his or her account information is secure and will not be compromised during its transmission to the software vendor. Therefore, the public-switched telephone network (PSTN) remains the only secure accepted method for transmitting such account information.

However, the infrastructure exists to handle such massive download capabilities. The existing broadcast television and cable industry has such an infrastructure in place at this time. The high bandwidth of such a system would alleviate any lengthy download problems by saving many hours of dedicated connection time required for most user having analog connections. Additionally, the process would be painless for the user since programming to download a broadcast software distribution is very similar to using existing video tape recorders to record a television program. The user need not be present during the download process as it would be accomplished automatically. Furthermore, such broadcast industry also has in place the accounting and billing systems to automatically bill the user according to any particular software that may be downloaded across a broadcast channel. Therefore, it is desirable that the television broadcast infrastructure be used to distribute software to the user.

SUMMARY OF THE INVENTION

The invention disclosed and claimed herein is a method for distributing software. A television broadcast distribution system is provided having one or more broadcast channels for broadcasting analog and digital television information to a receiver of a user. Select ones of the one or more broadcast channels are designated for the transmission of one or more software data streams. The software data streams are transmitted over the select ones of the one or more broadcast channels at a scheduled time, each of the one or more software data streams having a unique ID associated therewith. One or more of the software data streams are selected for download via the receiver according to the respective unique ID. The selected one or more software data streams are downloaded via the receiver to a user storage device during the scheduled time.

BRIEF DESCRIPTION OF THE DRAWINGS

For a more complete understanding of the present invention and the advantages thereof, reference is now made to the following description taken in conjunction with the accompanying Drawings in which:

FIG. 10 illustrates a more detailed, simplified block diagram of the embodiment of FIG. 9;

FIG. 11 illustrates a diagrammatic view of a method for performing the routing operation;

FIG. 12 illustrates a block diagram of an alternate embodiment utilizing an optical region in the video image for generating the routing information;

FIG. 13 illustrates a block diagram illustrating the generation of a profile with the disclosed embodiment;

FIG. 17 illustrates a flowchart of the process for downloading selected software distributions;

FIG. 18 illustrates a diagrammatic view of the broadcast software program with a sequence of software packages transmitted;

DETAILED DESCRIPTION OF THE INVENTION

Figure 1:
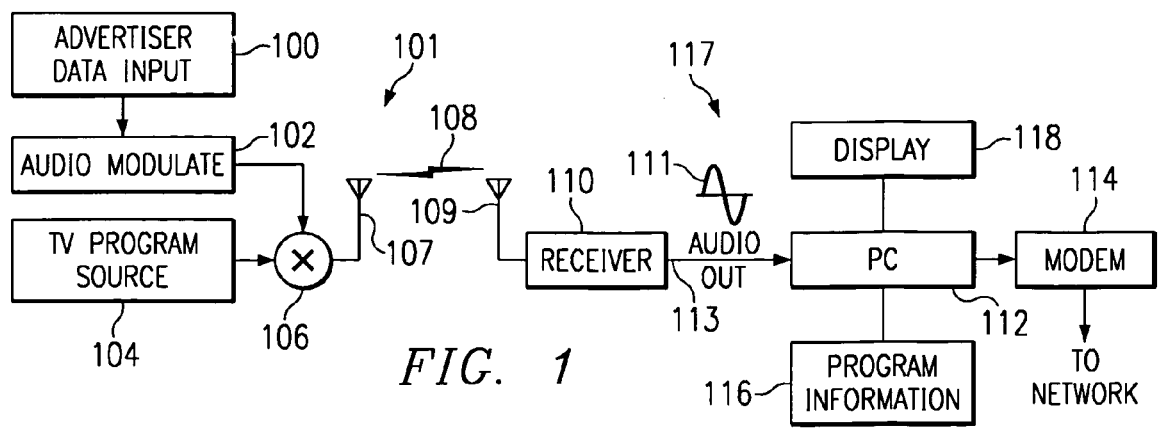
FIG. 1 illustrates a block diagram of an embodiment for accessing information across a global communication network.

Referring now to FIG. 1, there is illustrated a block diagram of a system for controlling a personal computer ("PC") 112 via an audio tone transmitted over a wireless system utilizing a TV. In the embodiment illustrated in FIG. 1, there is provided a transmission station 101 and a receive station 117 that are connected via a communication link 108. The transmission station 101 is comprised of a television program source 104, which is operable to generate a program in the form of a broadcast signal comprised of video and audio. This is transmitted via conventional techniques along channels in the appropriate frequencies. The program source is input to a mixing device 106, which mixing device is operable to mix in an audio signal. This audio signal is derived from an audio source 100 which comprises a coded audio signal which is then modulated onto a carrier which is combined with the television program source 104. This signal combining can be done at the audio level, or it can even be done at the RF level in the form a different carrier. However, the preferred method is to merely sum the audio signal from the modulator 102 into the audio channel of the program that is generated by the television program source 104. The output thereof is provided from the mixing device 106 in the form of broadcast signal to an antenna 107, which transmits the information over the communication link 108 to an antenna 109 on the receive side.

On the receive side of the system, a conventional receiver 110, such as a television is provided. This television provides a speaker output which provides the user with an audible signal. This is typically associated with the program. However, the receiver 110 in the disclosed embodiment, also provides an audio output jack, this being the type RCA jack. This jack is utilized to provide an audio output signal on a line 113 which is represented by an audio signal 111. This line 113 provides all of the audio that is received over the communication link 108 to the PC 112 in the audio input port on the PC 112. However, it should be understood that, although a direct connection is illustrated from the receiver 110 to the PC 112, there actually could be a microphone pickup at the PC 112 which could pick the audio signal up. In the disclosed embodiment, the audio signal generated by the advertiser data input device 100 is audible to the human ear and, therefore, can be heard by the user. Therefore, no special filters are needed to provide this audio to the PC 112.

The PC 112 is operable to run programs thereon which typically are stored in a program file area 116. These programs can be any type of programs such as word processing programs, application programs, etc. In the disclosed embodiment, the program that is utilized in the system is what is referred to as a "browser." The PC 112 runs a browser program to facilitate the access of information on the network, for example, a global communication network known as the "Internet" or the World-Wide-Web ("Web"). The browser is a hypertext-linked application used for accessing information. Hypertext is a term used to describe a particular organization of information within a data processing system, and its presentation to a user. It exploits the computer's ability to link together information from a wide variety of sources to provide the user with the ability to explore a particular topic. The traditional style of presentation used in books employs an organization of the information which is imposed upon it by limitations of the medium, namely fixed sized, sequential paper pages. Hypertext systems, however, use a large number of units of text or other types of data such as image information, graphical information, video information, or sound information, which can vary in size. A collection of such units of information is termed a hypertext document, or where the hypertext documents employ information other than text, hypermedia documents. Multimedia communications may use the Hypertext Transfer Protocol ("HTTP"), and files or formatted data may use the Hypertext Markup Language ("HTML"). This formatting language provides for a mingling of text, graphics, sound, video, and hypertext links by "tagging" a text document using HTML. Data encoded using HTML is often referred to as an "HTML document," an "HTML page," or a "home page." These documents and other Internet resources may be accessed across the network by means of a network addressing scheme which uses a locator referred to as a Uniform Resource Locator ("URL"), for example, "http://www.digital.com."

The Internet is one of the most utilized networks for interconnecting distributed computer systems and allows users of these computer systems to exchange data all over the world. Connected to the Internet are many private networks, for example, corporate or commercial networks. Standard protocols, such as the Transport Control Protocol ("TCP") and the Internet Protocol ("IP") provide a convenient method for communicating across these diverse networks. These protocols dictate how data are formatted and communicated. As a characteristic of the Internet, the protocols are layered in an IP stack. At higher levels of the IP stack, such as the application layer (where HTTP is employed), the user information is more readily visible, while at lower levels, such as the network level (where TCP/IP are used), the data can merely be observed as packets or a stream of rapidly moving digital signals. Superimposed on the Internet is a standard protocol interface for accessing Web resources, such as servers, files, Web pages, mail messages, and the like. One way that Web resources can be accessed is by browsers made by Netscape® and Microsoft Internet Explorer®.

Referring again now to FIG. 1, the user can load this program with the appropriate keystrokes such that a browser window will be displayed on a display 118. In one embodiment, the user can run the browser program on the PC 112 such that the browser window is displayed on the display 118. While watching a preferred program, the user can also view display 118. When an audio signal is received by the receiver 110 and the encoded information is contained therein that was input thereto by the advertiser, the PC 112 will then perform a number of operations. The first operation, according to the disclosed embodiment, is to extract the audio information within the received audio signal in the form of digital data, and then transmit this digital data to a defined location on the global communication network via a modem connection 114. This connection will be described hereinbelow. This information will be relayed to a proprietary location and the instructions sent back to the PC 112 as to the location of the advertiser associated with the code, and the PC 112 will then effect a communication link to that location such that the user can view on the display 118 information that the advertiser, by the fact of putting the tone onto the broadcast channel, desires the viewer to view. This information can be in the form of interactive programs, data files, etc. In one example, when an advertisement appears on the television, the tone can be generated and then additional data displayed on the display 118. Additionally, a streaming video program could be played on the PC received over the network, which streaming video program is actually longer than the advertising segment on the broadcast. Another example would be a sports game that would broadcast the tone in order to allow a user access to information that is not available over the broadcast network, such as additional statistics associated with the sports program, etc.

By utilizing the system described herein with respect to the disclosed embodiment of FIG. 1, an advertiser is allowed the ability to control a user's PC 112 through the use of tones embedded within a program audio signal. As will described hereinbelow, the disclosed embodiment utilizes particular routing information stored in the PC 112 which allows the encoded information in the received audio signal to route this information to a desired location on the network, and then allow other routing information to be returned to the PC 112 for control thereof to route the PC 112 to the appropriate location associated with that code.

Figure 2:
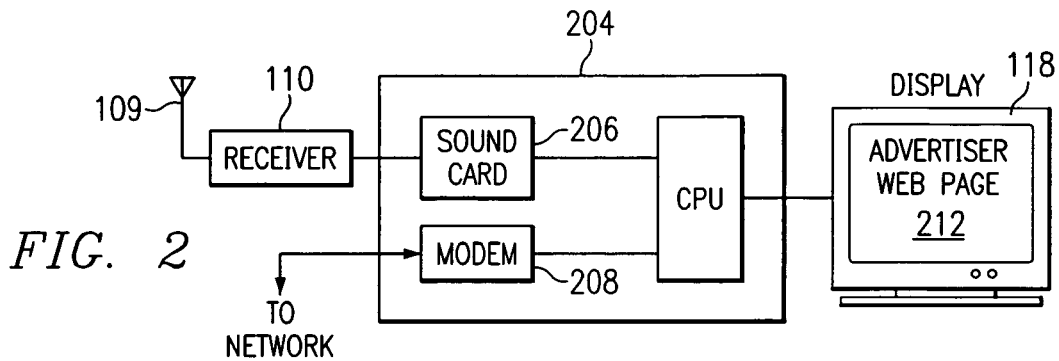
FIG. 2 illustrates the computer components employed in the embodiment of FIG. 1.

Referring now to FIG. 2, there is illustrated a computer 204, similar to computer 112, connected to display information on display 118. The computer 204 comprises an internal audio or "sound" card 206 for receiving the transmitted audio signal through receive antenna 109 and receiver 110. The sound card 206 typically contains analog-to-digital circuitry for converting the analog audio signal into a digital signal. The digital signal may then be more easily manipulated by software programs. The receiver 110 separates the audio signal from the video signal. A special trigger signal located within the transmitted advertiser audio signal triggers proprietary software running on the computer 204 which launches a communication application, in this particular embodiment, the web browser application located on the PC 204. Coded advertiser information contained within the audio signal is then extracted and appended with the address of a proprietary server located on the communication network. The remote server address is in the form of a URL. This appended data, in addition to other control codes, is inserted directly into the web browser application for automatic routing to the communication network.

The web browser running on PC 204, and communicating to the network, through an internal modem 208, in this embodiment, transmits the advertiser information to the remote server. The remote server cross-references the advertiser product information to the address of the advertiser server located on the network. The address of the advertiser server is routed back through the PC 204 web browser to the advertiser server. The advertiser product information is returned to PC 204 to be presented to the viewer on display 118. In this particular embodiment, the particular advertiser product information displayed is contained within the advertiser's web page 212. As mentioned above, the audio signal is audible to the human ear. Therefore the audio signal, as emitted from the TV speakers, may be input to the sound card 206 via a microphone. Furthermore, the audio signal need not be a real-time broadcast, but may be on video tapes, CDs, DVD, or other media which may be displayed at a later date. With the imminent implementation of high definition digital television, the audio signal output from the TV may also be digital. Therefore, direct input into a sound card for A/D purposes may not be necessary, but alternative interfacing techniques to accommodate digital-to-digital signal formats would apply.

Figure 3:
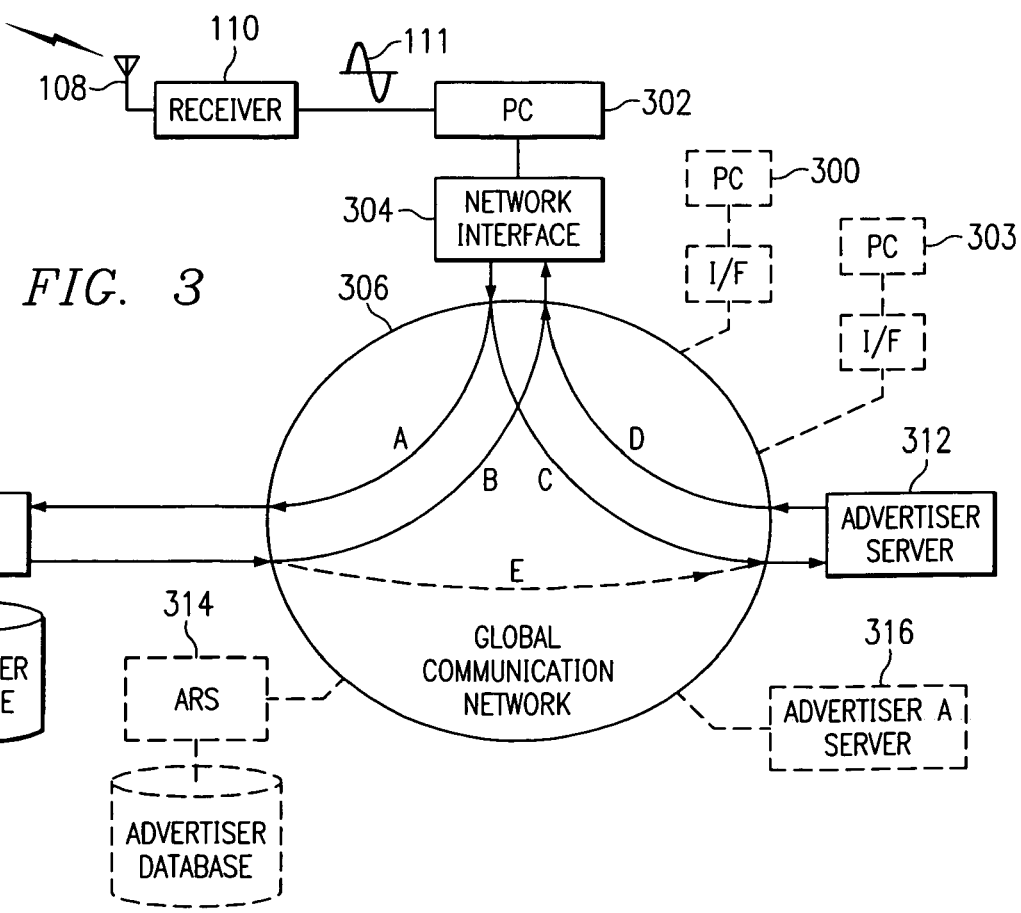
FIG. 3 illustrates system interactions over a global network.

Referring now to FIG. 3, there is illustrated a source PC 302, similar to PCs 204 and 112, connected to a global communication Network (GCN) through an interface 304. In this embodiment, the audio signal 111 is received by PC 302 through its sound card 206. The audio signal 111 comprises a trigger signal which triggers proprietary software into launching a web browser application residing on the PC 302. The audio signal 111 also comprises advertiser product information which is extracted and appended with URL information of an Advertiser Reference Server ("ARS") 308. The ARS 308 is a system disposed on the GCN 306 that is defined as the location to which data in the audio signal 111 is to be routed. As such, data in the audio signal 111 will always be routed to the ARS 308, since a URL is unique on the GCN 306.

Connected to the ARS 308 is a database 310 of product codes and associated manufacturer URLs. The database 310 undergoes a continual update process which is transparent to the user. As companies sign-on, i.e., subscribe, to this technology, manufacturer and product information is added to the database 310 without interrupting operation of the source PC 302 with frequent updates. When the advertiser server address URL is obtained from the ARS database 310, it and the request for the particular advertiser product information are automatically routed back through the web browser on PC 302, over to the respective advertiser server for retrieval of the advertiser product information to the PC 302. Additionally although the disclosed invention discusses a global communication network, the system is also applicable to LANs, WANs, and peer-to-peer network configurations. It should be noted that the disclosed architecture is not limited to a single source PC 302, but may comprise a plurality of source PCs, e.g., PC 300 and PC 303. Moreover, a plurality of ARS 308 systems and advertiser servers 312 may be implemented, e.g., ARS 314, and advertiser server A 316, respectively.

The information transactions, in general, which occur between the networked systems of this embodiment, over the communication network, are the following. The web browser running on source PC 302 transmits a message packet to the ARS 308 over Path "A." The ARS 308 decodes the message packet and performs a cross-reference function with product information extracted from the received message packet to obtain the address of an advertiser server 312. A new message packet is assembled comprising the advertiser server 312 address, and sent back to the source PC 302 over Path "B." A "handoff" operation is performed whereby the source PC 302 browser simply reroutes the information on to the advertiser server 312 over Path "C," with the appropriate source and destination address appended. The advertiser server 312 receives and decodes the message packet. The request-for-advertiser-product-information is extracted and the advertiser 312 retrieves the requested information from its database for transmission back to the source PC 302 over Path "D." The source PC 302 then processes the information, i.e., for display to the viewer. The optional Path "E" is discussed hereinbelow. It should be noted that the disclosed methods are not limited to only browser communication applications, but may accommodate, with sufficient modifications by one skilled in the art, other communication applications used to transmit information over the Internet or communication network.

Figure 4A:
FIGS. 4a-4e illustrate the various message packets transmitted between the source PC and network servers used in an embodiment.

Referring now to FIG. 4*a*, the message packet 400 sent from the source PC 302 to ARS 308 via Path "A" comprises several fields. One field comprises the URL of the ARS 308 which indicates where the message packet is to be sent. Another field comprises the advertiser product code or other information derived from the audio signal 111, and any additional overhead information required for a given transaction. The product code provides a link to the address of the advertiser server 312, located in the database 310. Yet another field comprises the network address of the source PC 302. In general, network transmissions are effected in packets of information, each packet providing a destination address, a source address, and data. These packets vary depending upon the network transmission protocol utilized for communication. Although the protocols utilized in the disclosed embodiment are of a conventional protocol suite commonly known as TCP/IP, it should be understood that any protocols providing the similar basic functions can be used, with the primary requirement that a browser can forward the routing information to the desired URL in response to keystrokes being input to a PC. However, it should be understood that any protocol can be used, with the primary requirement that a browser can forward the product information to the desired URL in response to keystrokes being input to a PC. Within the context of this disclosure, "message packet" shall refer to and comprise the destination URL, product information, and source address, even though more than a single packet must be transmitted to effect such a transmission.

Figure 4B:

Upon receipt of the message packet 400 from source PC 302, ARS 308 processes the information in accordance with instructions embedded in the overhead information. The ARS 308 specifically will extract the product code information from the received packet 400 and, once extracted, will then decode this product code information. Once decoded, this information is then compared with data contained within the ARS advertiser database 310 to determine if there is a "hit." If there is no "hit" indicating a match, then information is returned to the browser indicating such. If there is a "hit," a packet 402 is assembled which comprises the address of the source PC 302, and information instructing the source PC 302 as to how to access, directly in a "handoff" operation, another location on the network, that of an advertiser server 312. This type of construction is relatively conventional with browsers such as Netscape® and Microsoft Internet Explorer® and, rather than displaying information from the ARS 308, the source PC 302 can then access the advertiser server 312. The ARS 308 transmits the packet 402 back to source PC 302 over Path "B." Referring now to FIG. 4*b*, the message packet 402 comprises the address of the source PC 302, the URL of the advertiser server 312 embedded within instructional code, and the URL of the ARS 308.

Figure 4C:

Upon receipt of the message packet 402 by the source PC 302, the message packet 402 is disassembled to obtain pertinent routing information for assembly of a new message packet 404. The web browser running on source PC 302 is now directed to obtain, over Path "C," the product information relevant to the particular advertiser server 312 location information embedded in message packet 404. Referring now to FIG. 4*c*, the message packet 404 for this transaction comprises the URL of the advertiser server 312, the request-for-product-information data, and the address of the source PC 302.

Figure 4D:

Upon receipt of the message packet 404 from source PC 302, advertiser server 312 disassembles the message packet 404 to obtain the request-for-product-information data. The advertiser server 312 then retrieves the particular product information from its database, and transmits it over Path "D" back to the source PC 302. Referring now to FIG. 4*d*, the message packet 406 for this particular transaction comprises the address of the source PC 302, the requested information, and the URL of the advertiser server 312.

Figure 4E:
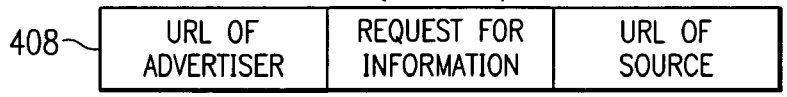

Optionally, the ARS 308 may make a direct request for product information over Path "E" to advertiser server 312. In this mode, the ARS 308 sends information to the advertiser server 312 instructing it to contact the source PC 302. This, however, is unconventional and requires more complex software control. The message packet 408 for this transaction is illustrated in FIG. 4*e*, which comprises the URL of the advertiser server 312, the request-for-product-information data, and the address of the source PC 302. Since product information is not being returned to the ARS 308, but directly to the source PC 302, the message packet 408 requires the return address to be that of the source PC 302. The product information is then passed directly to PC 302 over Path "D."

Figures 5, 7:
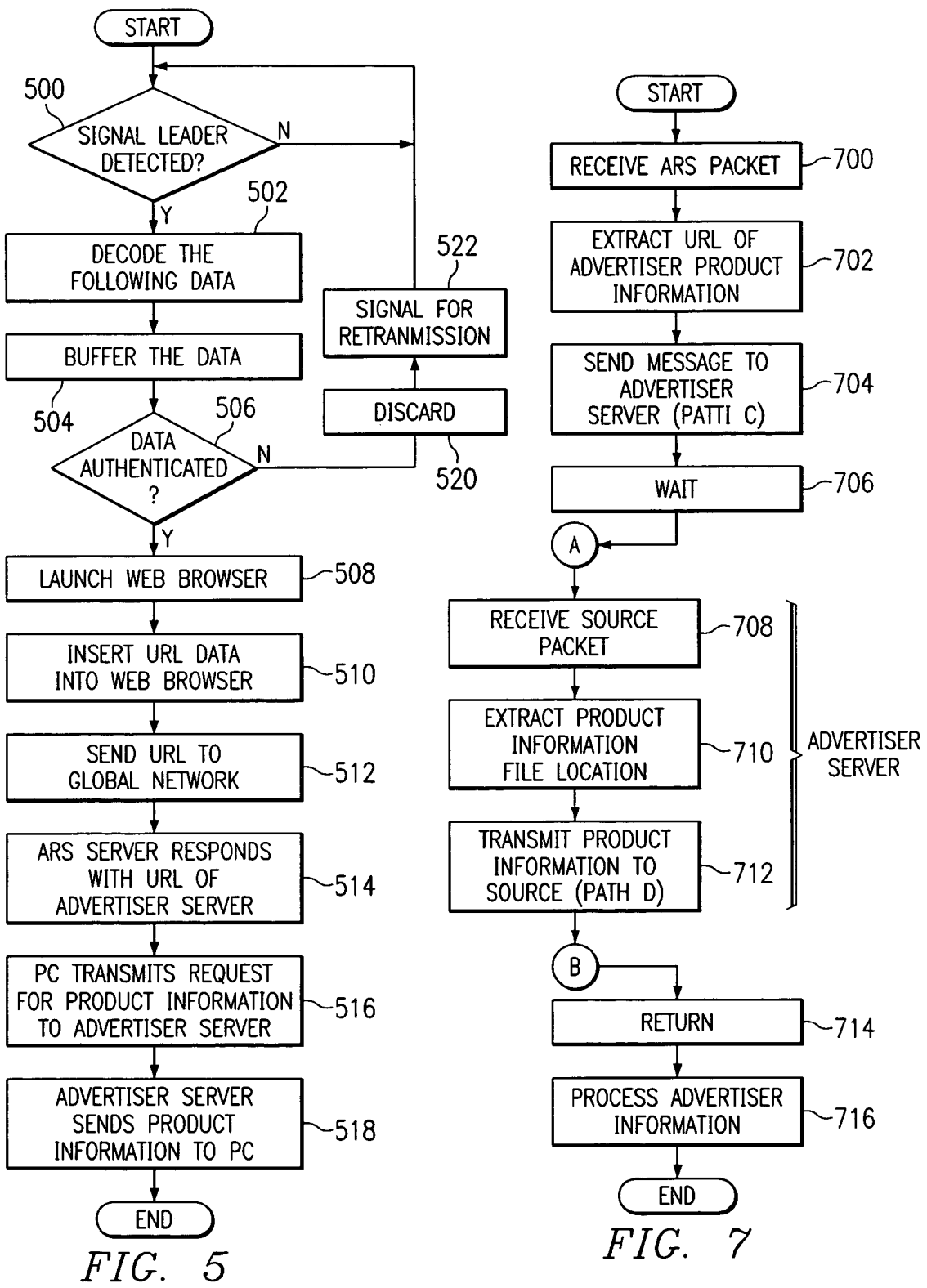
FIG. 5 is a flowchart depicting operation of the system according to a preferred embodiment.
FIG. 7 illustrates a flowchart of the interactive process between the source computer and ARS.

Referring now to FIG. 5, the method for detecting and obtaining product information is as follows. In decision block 500, a proprietary application running resident on a source computer PC 302 (similar to PC 204) monitors the audio input for a special trigger signal. Upon detection of the trigger signal, data following the trigger signal is decoded for further processing, in function block 502. In function block 504, the data is buffered for further manipulation. In decision block 506, a determination is made as to whether the data can be properly authenticated. If not, program flow continues through the "N" signal to function block 520 where the data is discarded. In function block 522, the program then signals for a retransmission of the data. The system then waits for the next trigger signal, in decision block 500. If properly authenticated in decision block 506, program flow continues through the "Y" signal path where the data is then used to launch the web browser application, as indicated in function block 508. In function block 510, the web browser receives the URL data, which is then automatically routed through the computer modem 208 to the network interface 304 and ultimately to the network 306. In function block 514, the ARS 308 responds by returning the URL of advertiser server 312 to the PC 302. In function block 516, the web browser running on the source PC 302, receives the advertiser URL information from the ARS 308, and transmits the URL for the product file to the advertiser server 312. In block 518, the advertiser server 312 responds by sending the product information to the source PC 302 for processing.

The user may obtain the benefits of this architecture by simply downloading the proprietary software over the network. Other methods for obtaining the software are well-known; for example, by CD, diskette, or pre-loaded hard drives.

Figure 6:
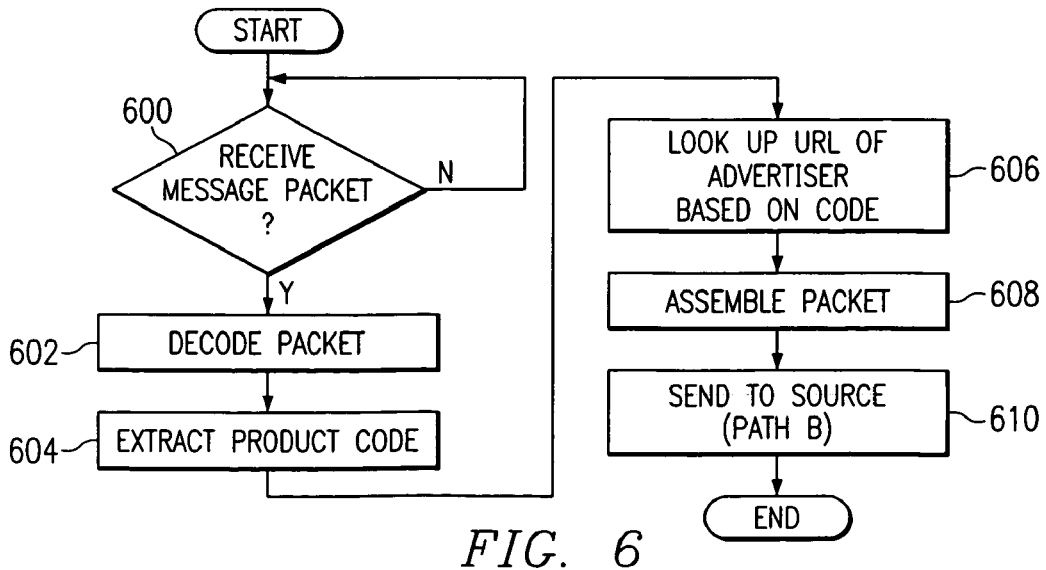
FIG. 6 illustrates a flowchart of actions taken by the Advertiser Reference Server ("ARS") server.

Referring now to FIG. 6, there is illustrated a flowchart of the process the ARS 308 may undergo when receiving the message packet 400 from the source PC 302. In decision block 600, the ARS 308 checks for the receipt of the message packet 400. If a message packet 400 is not received, program flow moves along the "N" path to continue waiting for the message. If the message packet 400 is received, program flow continues along path "Y" for message processing. Upon receipt of the message packet 400, in function block 602, the ARS 308 decodes the message packet 400. The product code is then extracted independently in function block 604 in preparation for matching the product code with the appropriate advertiser server address located in the database 310. In function block 606, the product code is then used with a look-up table to retrieve the advertiser server 312 URL of the respective product information contained in the audio signal data. In function block 608, the ARS 308 then assembles message packet 402 for transmission back to the source PC 302. Function block 610 indicates the process of sending the message packet 402 back to the source PC 302 over Path "B."

Referring now to FIG. 7, there is illustrated a flowchart of the interactive processes between the source PC 302 and the advertiser server 312. In function block 700, the source PC 302 receives the message packet 402 back from the ARS 308 and begins to decode the packet 402. In function block 702, the URL of the advertiser product information is extracted from the message packet 402 and saved for insertion into the message packet 404 to the advertiser server 312. The message packet 404 is then assembled and sent by the source PC 302 over Path "C" to the advertiser server 312:n function block 704. While the source PC 302 waits, in function block 706, the advertiser server 312 receives the message packet 404 from the source PC 302, in function block 708, and disassembles it. The product information location is then extracted from the message packet 404 in function block 710. The particular product information is retrieved from the advertiser server 312 database for transmission back to the source PC 302. In function block 712, the product information is assembled into message packet 406 and then transmitted back to the source PC 302 over Path "D." Returning to the source PC 302 in function block 714, the advertiser product information contained in the message packet 406 received from the advertiser server 312, is then extracted and processed in function block 716.

Figure 8:
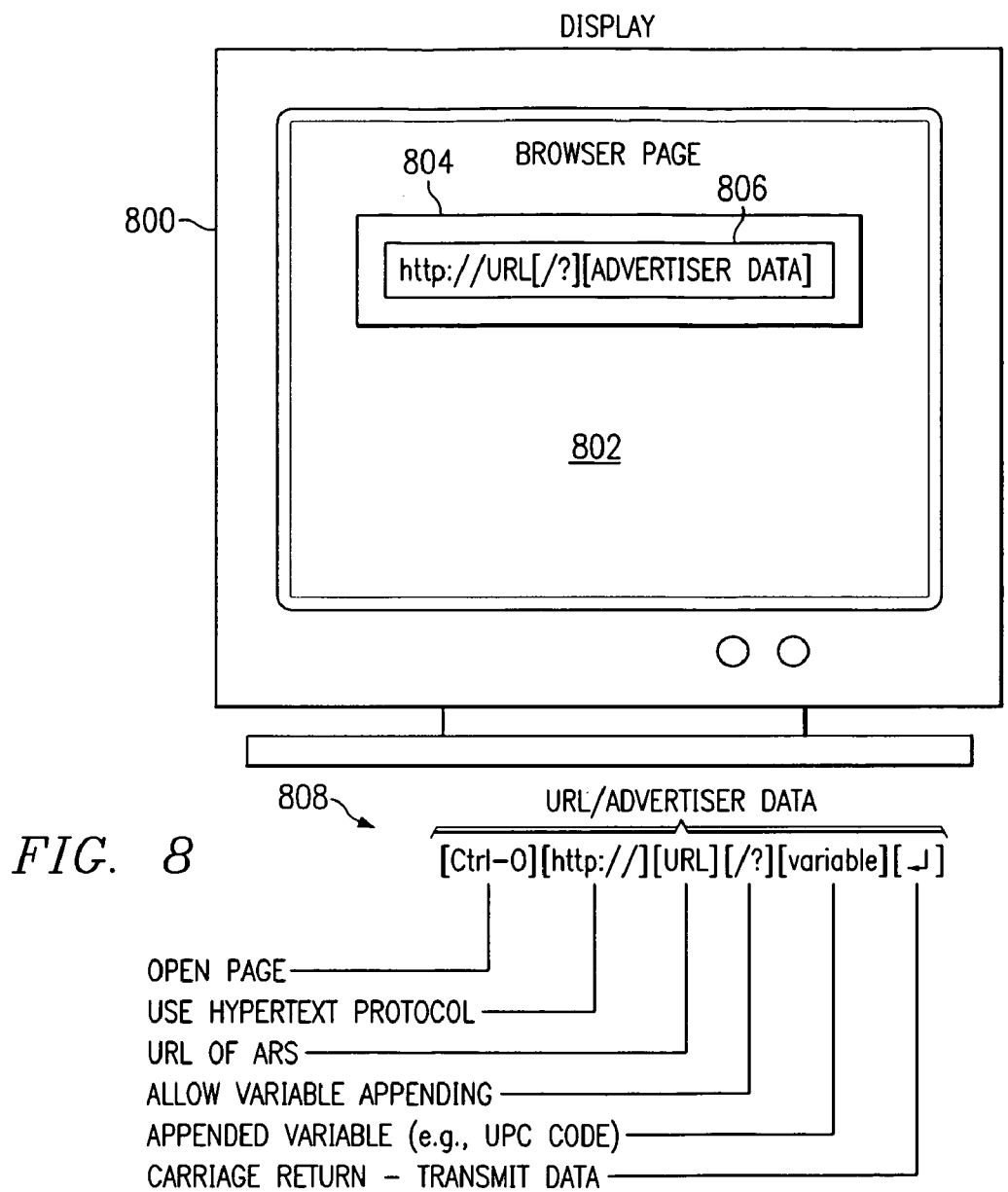
FIG. 8 illustrates a web browser page receiving the modified URL/advertiser product data according to a preferred embodiment.

Referring now to FIG. 8, after receipt of a trigger signal, a web browser application on a source PC 302 is automatically launched and computer display 800 presents a browser page 802. Proprietary software running on the source PC 302 processes the audio signal data after being digitized through the sound card 206. The software appropriately prepares the data for insertion directly into the web browser by extracting the product information code and appending keystroke data to this information. First, a URL page 804 is opened in response to a Ctrl-O command added by the proprietary software as the first character string. Opening URL page 804 automatically positions the cursor in a field 806 where additional keystroke data following the Ctrl-O command will be inserted. After URL page 804 is opened, the hypertext protocol preamble http:// is inserted into the field 806. Next, URL information associated with the location of the ARS 308 is inserted into field 806. Following the ARS 308 URL data are the characters /? to allow entry of variables immediately following the /? characters. In this embodiment, the variable following is the product information code received in the audio signal. The product code information also provides the cross-reference information for obtaining the advertiser URL from the ARS database 310. Next, a carriage return is added to send the URL/product data and close the window 804. After the message packet 400 is transmitted to the ARS 308 from the source PC 302, transactions from the ARS 308, to the source PC 302, to the advertiser server 312, and back to the source PC 302, occur quickly and are transparent to the viewer. At this point, the next information the viewer sees is the product information which was received from the advertiser server 312.

Figure 9:
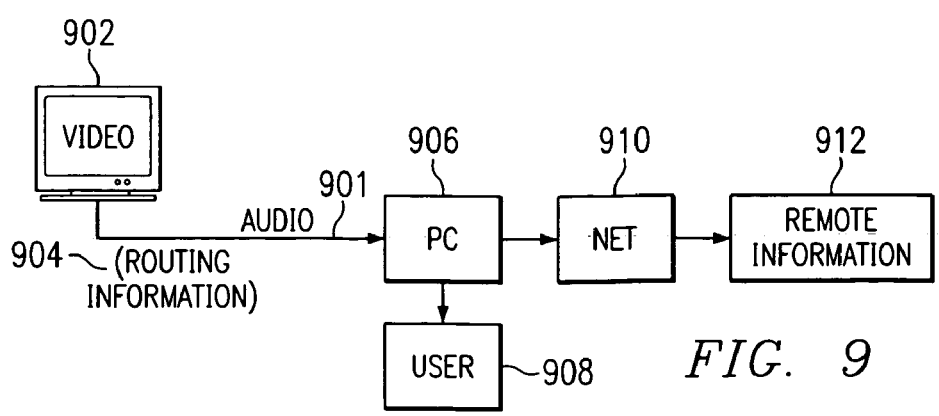
FIG. 9 illustrates a simplified block diagram of the disclosed embodiment.

Referring now to FIG. 9, there is illustrated a block diagram of a more simplified embodiment. In this embodiment, a video source 902 is provided which is operable to provide an audio output on an audio cable 901 which provides routing information referred to by reference numeral 904. The routing information 904 is basically information contained within the audio signal. This is an encoded or embedded signal. The important aspect of the routing information 904 is that it is automatically output in realtime as a function of the broadcast of the video program received over the video source 902. Therefore, whenever the program is being broadcast in realtime to the user 908, the routing information 904 will be output whenever the producer of the video desires it to be produced. It should be understood that the box 902 representing the video source could be any type of media that will result in the routing information being output. This could be a cassette player, a DVD player, an audio cassette, a CD ROM or any such media. It is only important that this is a program that the producer develops which the user 908 watches in a continuous or a streaming manner. Embedded within that program, at a desired point selected by the producer, the routing information 904 is output.

The audio information is then routed to a PC 906, which is similar to the PC 112 in FIG. 1. A user 908 is interfaced with the PC to receive information thereof, the PC 906 having associated therewith a display (not shown). The PC 906 is interfaced with a network 910, similar to the network 306 in FIG. 3. This network 910 has multiple nodes thereon, one of which is the PC 906, and another of which is represented by a network node 912 which represents remote information. The object of the present embodiment is to access remote information for display to the user 908 by the act of transmitting from the video program in block 902 the routing information 904. This routing information 904 is utilized to allow the PC 906 which has a network "browser" running thereon to "fetch" the remote information at the node 912 over the network 910 for display to the user 908. This routing information 904 is in the form of an embedded code within the audio signal, as was described hereinabove.

Referring now to FIG. 10, there is illustrated a more detailed block diagram of the embodiment of FIG. 9. In this embodiment, the PC 906 is split up into a couple of nodes, a first PC 1002 and a second PC 1004. The PC 1002 resides at the node associated with the user 908, and the PC 1004 resides at another node. The PC 1004 represents the ARS 308 of FIG. 3. The PC 1004 has a database 1006 associated therewith, which is basically the advertiser database 310. Therefore, there are three nodes on the network 910 necessary to implement the disclosed embodiment, the PC 1002, the PC 1004 and the remote information node 912. The routing information 904 is utilized by the PC 1002 for routing to the PC 1004 to determine the location of the remote information node 912 on the network 910. This is returned to the PC 1002 and a connection made directly with the remote information node 912 and the information retrieved therefrom to the user 908. The routing information 904 basically constitutes primary routing information.

Referring now to FIG. 11, there is illustrated a diagrammatic view of how the network packet is formed for sending the primary routing information to the PC 1004. In general, the primary routing information occupies a single field which primary routing information is then assembled into a data packet with the secondary routing information for transfer to the network 910. This is described hereinabove in detail.

Referring now to FIG. 12, there is illustrated an alternate embodiment to that of FIG. 9. In this embodiment, the video source 902 has associated therewith an optical region 1202, which optical region 1202 has disposed therein an embedded video code. This embedded video code could be relatively complex or as simple as a grid of dark and white regions, each region in the grid able to have a dark color for a logic "1" or a white region for a logic "0." This will allow a digital value to be disposed within the optical region 1202. A sensor 1204 can then be provided for sensing this video code. In the example above, this would merely require an array of optical detectors, one for each region in the grid to determine whether this is a logic "1" or a logic "0" state. One of the sensed video is then output to the PC 906 for processing thereof to determine the information contained therein, which information contained therein constitutes the primary routing information 904. Thereafter, it is processed as described hereinabove with reference to FIG. 9.

Referring now to FIG. 13, there is illustrated a block diagram for an embodiment wherein a user's profile can be forwarded to the original subscriber or manufacturer. The PC 906 has associated therewith a profile database 1302, which profile database 1302 is operable to store a profile of the user 908. This profile is created when the program, after initial installation, requests profile information to be input in order to activate the program. In addition to the profile, there is also a unique ID that is provided to the user 908 in association with the browser program that runs on the PC 906. This is stored in a storage location represented by a block 1304. This ID 1304 is accessible by a remote location as a "cookie" which is information that is stored in the PC 906 in an accessible location, which accessible location is actually accessible by the remote program running on a remote node.

The ARS 308, which basically constitutes the PC 1004 of FIG. 10, is operable to have associated therewith a profile database 1308, which profile database 1308 is operable to store profiles for all of the users. The profile database 1308 is a combination of the information stored in profile database 1302 for all of the PCs 906 that are attachable to the system. This is to be distinguished from information stored in the database 310 of the ARS 308, the advertiser's database, which contains intermediate destination tables. When the routing information in the primary routing information 904 is forwarded to the ARS 308 and extracted from the original data packet, the look-up procedure described hereinabove can then be performed to determine where this information is to be routed. The profile database 1302 is then utilized for each transaction, wherein each transaction in the form of the routing information received from the primary routing information 904 is compared to the destination tables of database 310 to determine what manufacturer is associated therewith.

The associated ID 1304 that is transmitted along with the routing information in primary routing information 904 is then compared with the profile database 1308 to determine if a profile associated therewith is available. This information is stored in a transaction database 1310 such that, at a later time, for each routing code received in the form of the information in primary routing information 904, there will associated therewith the IDs 1304 of each of the PCs 906. The associated profiles in database 1308, which are stored in association with IDs 1304, can then be assembled and transmitted to a subscriber as referenced by a subscriber node 1312 on the network 910. The ARS 308 can do this in two modes, a realtime mode or a non-realtime mode. In a realtime mode, each time a PC 906 accesses the advertiser database 310, that user's profile information is uploaded to the subscriber node 1312. At the same time, billing information is generated for that subscriber 1312 which is stored in a billing database 1316. Therefore, the ARS 308 has the ability to inform the subscriber 1312 of each transaction, bill for those transactions, and also provide to the subscriber 1312 profile information regarding who is accessing the particular product advertisement having associated therewith the routing information field 904 for a particular routing code as described hereinabove. This information, once assembled, can then be transmitted to the subscriber 1312 and also be reflected in billing information and stored in the billing information database 1316.

Figure 14:
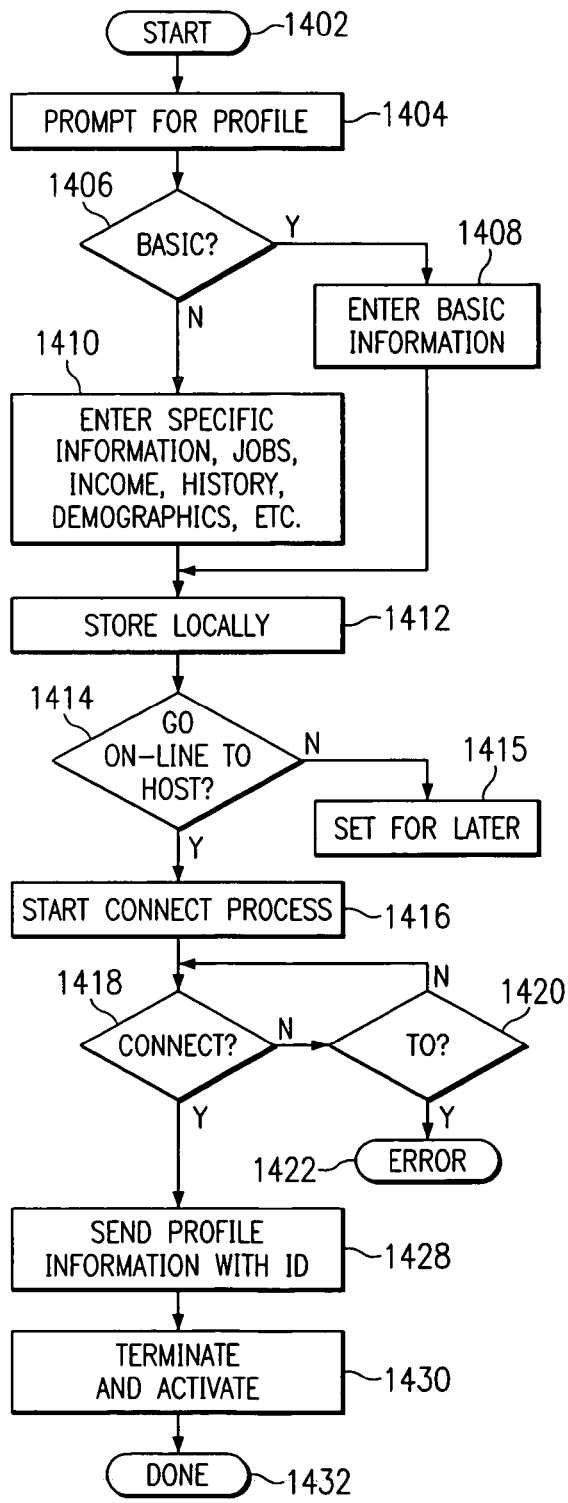
FIG. 14 illustrates a flowchart for generating the profile and storing at the ARS.

Referring now to FIG. 14, there is illustrated a flowchart depicting the operation for storing the profile for the user. The program is initiated in a block 1402 and then proceeds to a function block 1404, wherein the system will prompt for the profile upon initiation of the system. This initiation is a function that is set to activate whenever the user initially loads the software that he or she is provided. The purpose for this is to create, in addition to the setup information, a user profile. Once the user is prompted for this, then the program will flow to a decision block 1406 to determine whether the user provides basic or detailed information. This is selectable by the user. If selecting basic, the program will flow to a function block 1408 wherein the user will enter basic information such as name and serial number and possibly an address. However, to provide some incentive to the user to enter more information, the original prompt in function block 1404 would have offers for such things as coupons, discounts, etc., if the user will enter additional information. If the user selects this option, the program flows from the decision block 1406 to a function block 1410. In the function block 1410, the user is prompted to enter specific information such as job, income level, general family history, demographic information and more. There can be any amount of information collected in this particular function block.

Once all of the information is collected, in either the basic mode or the more specific mode, the program will then flow to a function block 1412 where this information is stored locally. The program then flows to a decision block 1414 to then go on-line to the host or the ARS 308. In general, the user is prompted to determine whether he or she wants to send this information to the host at the present time or to send it later. If he or she selects the "later" option, the program will flow to a function block 1415 to prompt the user at a later time to send the information. In the disclosed embodiment, the user will not be able to utilize the software until the profile information is sent to the host. Therefore, the user may have to activate this at a later time in order to connect with the host.

If the user has selected the option to upload the profile information to the host, the program will flow to the function block 1416 to initiate the connect process and then to a decision block 1418 to determine if the connection has been made. If not, the program will flow along a "N" path to decision block 1420 which will timeout to an error block 1422 or back to the input of the connect decision block 1418. The program, once connected, will then flow along a "Y" path from decision block 1418 to a function block 1428 to send the profile information with the ID of the computer or user to the host. The ID is basically, as described hereinabove, a "cookie" in the computer which is accessed by the program when transmitting to the host. The program will then flow to a function block 1430 to activate the program such that it, at later time, can operate without requiring all of the setup information. In general, all of the operation of this flowchart is performed with a "wizard" which steps the user through the setup process. Once complete, the program will flow to a Done block 1432.

Figure 15:
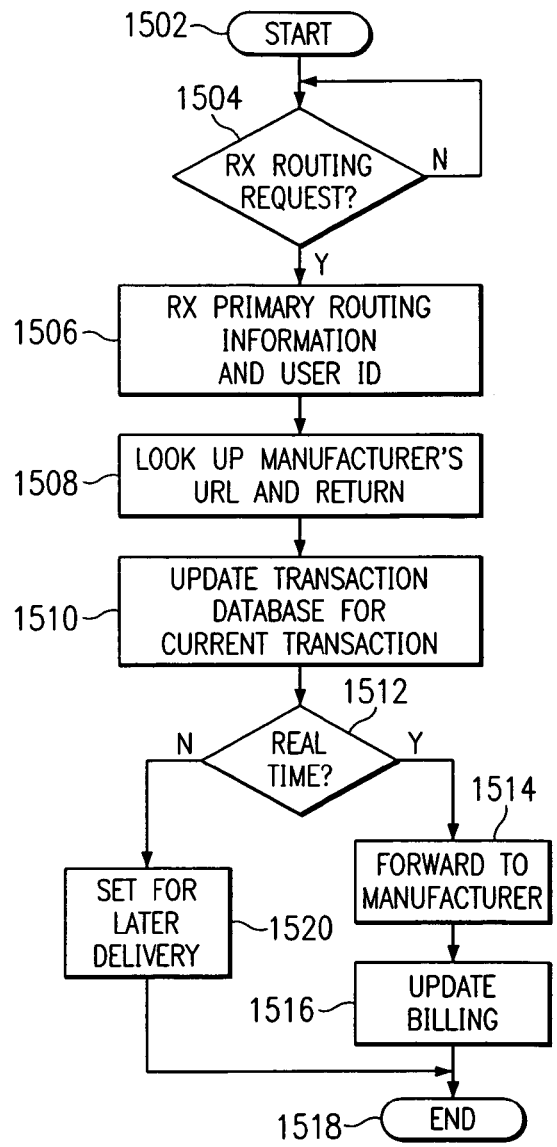
FIG. 15 illustrates a flowchart for processing the profile information when information is routed to a user.

Referring now to FIG. 15, there is illustrated a flowchart depicting the operation of the host when receiving a transaction. The program is initiated at a start block 1502 and then proceeds to decision block 1504, wherein it is determined whether the system has received a routing request, i.e., the routing information 904 in the form of a tone, etc., embedded in the audio signal, as described hereinabove with respect to FIG. 9. The program will loop back around to the input of decision block 1504 until the routing request has been received. At this time, the program will flow along the "Y" path to a function block 1506 to receive the primary routing information and the user ID. Essentially, this primary routing information is extracted from the audio tone, in addition to the user ID. The program then flows to a function block 1508 to look up the manufacturer URL that corresponds to the received primary routing information and then return the necessary command information to the originating PC 112 in order to allow that PC 112 to connect to the destination associated with the primary routing information. Thereafter, the program will flow to a function block 1510 to update the transaction database 1310 for the current transaction. In general, the routing information 904 will be stored as a single field with the associated IDs. The profile database 1308, as described hereinabove, has associated therewith detailed profiles of each user on the system that has activated their software in association with their ID. Since the ID was sent in association with the routing information, what is stored in the transaction database 1310 is the routing code, in association with all of the IDs transmitted to the system in association with that particular routing code. Once this transaction database 1310 has been updated, as described hereinabove, the transactions can be transferred back to the subscriber at node 312 with the detailed profile information from the profile database 1308.

The profile information can be transmitted back to the subscriber or manufacturer at the node 312 in realtime or non-realtime. A decision block 1512 is provided for this, which determines if the delivery is realtime. If realtime, the program will flow along a "Y" path to a function block 1514 wherein the information will be immediately forwarded to the manufacturer or subscriber. The program will then flow to a function block 1516 wherein the billing for that particular manufacturer or subscriber will be updated in the billing database 1316. The program will then flow into an End block 1518. If it was non-realtime, the program moves along the "N" path to a function block 1520 wherein it is set for a later delivery and it is accrued in the transaction database 1310. In any event, the transaction database 1310 will accrue all information associated with a particular routing code.

With a realtime transaction, it is possible for a manufacturer to place an advertisement in a magazine or to place a product on a shelf at a particular time. The manufacturer can thereafter monitor the times when either the advertisements or the products are purchased. Of course, they must be scanned into a computer which will provide some delay. However, the manufacturer can gain a very current view of how a product is moving. For example, if a cola manufacturer were to provide a promotional advertisement on, for example, television, indicating that a new cola was going to be placed on the shelf and that the first 1000 purchasers, for example, scanning their code into the network would receive some benefit, such as a chance to win a trip to some famous resort in Florida or some other incentive, the manufacturer would have a very good idea as to how well the advertisement was received. Further, the advertiser would know where the receptive markets were. If this advertiser, for example, had placed the television advertisement in ten cities and received overwhelming response from one city, but very poor response from another city, he would then have some inclination to believe that either the one poor-response city was not a good market or that the advertising medium he had chosen was very poor. Since the advertiser can obtain a relatively instant response and also content with that response as to the demographics of the responder, very important information can be obtained in a relatively short time.

It should be noted that the disclosed embodiment is not limited to a single source PC 302, but may encompass a large number of source computers connected over a global communication network. Additionally, the embodiment is not limited to a single ARS 308 or a single advertiser server 312, but may include a plurality of ARS and advertiser systems, indicated by the addition of ARS 314 and advertiser server A 316, respectively. It should also be noted that this embodiment is not limited only to global communication networks, but also may be used with LAN, WAN, and peer-to-peer configurations.

It should also be noted that the disclosed embodiment is not limited to a personal computer, but is also applicable to, for example, a Network Computer ("NetPC"), a scaled-down version of the PC, or any system which accommodates user interaction and interfaces to information resources.

One typical application of the above noted technique is for providing a triggering event during a program, such as a sport event. In a first example, this may be generated by an advertiser. One could imagine that, due to the cost of advertisements in a high profile sports program, there is a desire to utilize this time wisely. If, for example, an advertiser contracted for 15 seconds worth of advertising time, they could insert within their program a tone containing the routing information. This routing information can then be output to the user's PC 302 which will cause the user's PC 302 to, via the network, obtain information from a remote location typically controlled by the advertiser. This could be in the form of an advertisement of a length longer than that contracted for. Further, this could be an interactive type of advertisement. An important aspect to the type of interaction between the actual broadcast program with the embedded routing information and the manufacturer's site is the fact that there is provided information as to the user's PC 302 and a profile of the user themselves. Therefore, an advertiser can actually gain realtime information as to the number of individuals that are watching their particular advertisement and also information as to the background of those individuals, demographic information, etc. This can be a very valuable asset to an advertiser.

In another example, the producer of the program, whether it be an on-air program, a program embedded in a video tape, CD-ROM, DVD, or a cassette, can allow the user to automatically access additional information that is not displayed on the screen. For example, in a sporting event, various statistics can be provided to the user from a remote location, merely by the viewer watching the program. When these statistics are provided, the advertiser can be provided with demographic information and background information regarding the user. This can be important when, for example, the user may record a sports program. If the manufacturer sees that this program routing code is being output from some device at a time later than the actual broadcast itself, this allows the advertisers to actually see that their program is still being used and also what type of individual is using it. Alternatively, the broadcaster could determine the same and actually bill the advertiser an additional sum for a later broadcast. This is all due to the fact that the routing information automatically, through a PC and a network, will provide an indication to the advertiser the time at which the actual information was broadcast.

The different type of medium that can be utilized with the above embodiment are such things as advertisements, which are discussed hereinabove, contests, games, news programs, education, coupon promotional programs, demonstration media (demos), and photographs, all of which can be broadcast on a private site or a public site. This all will provide the ability to allow realtime interface with the network and the remote location for obtaining the routed information and also allow for realtime billing and accounting.

Figure 16:
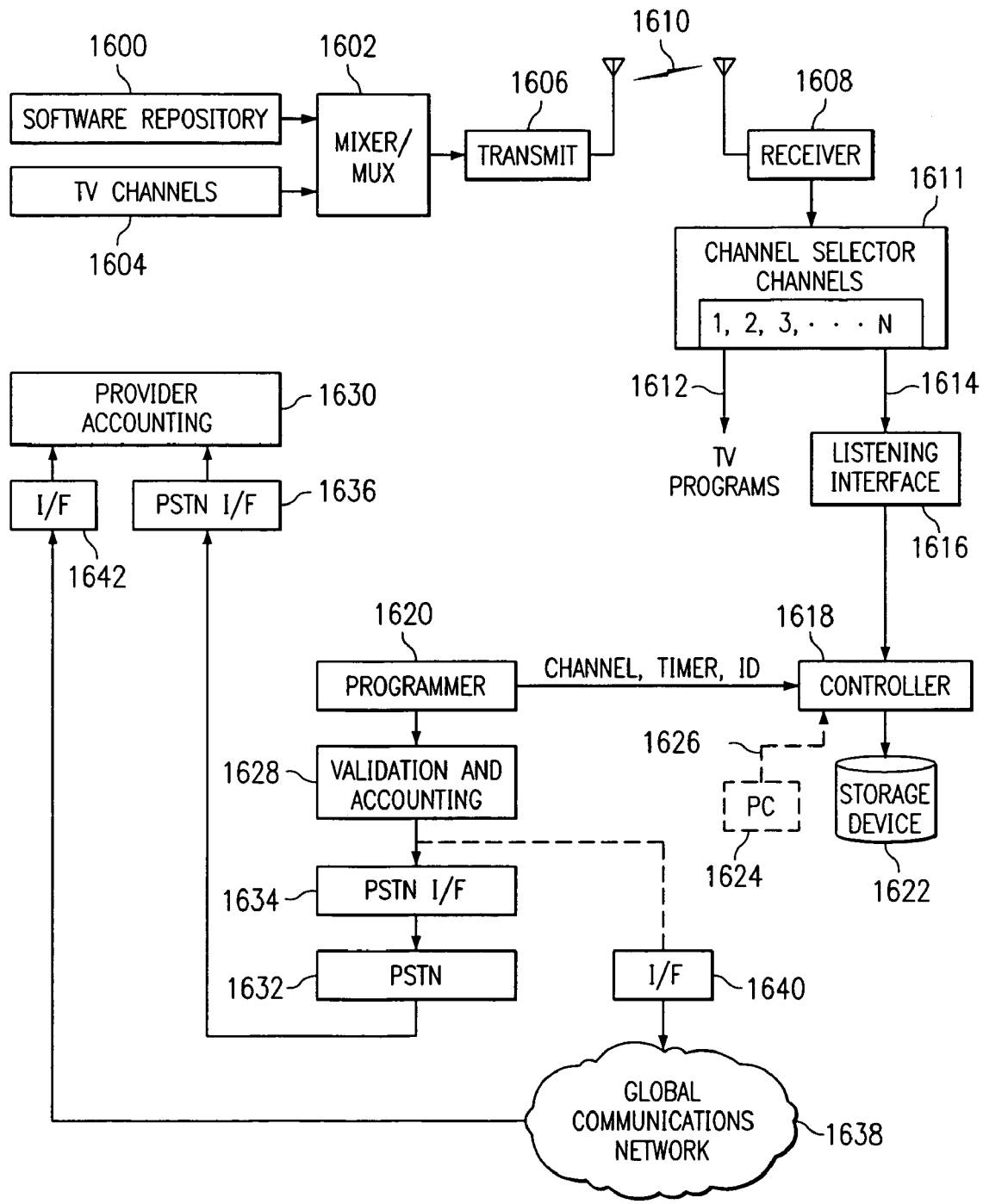
FIG. 16 illustrates a block diagram of the software broadcast distribution system, according to a disclosed embodiment.

Referring now to FIG. 16, there is illustrated a block diagram of a software broadcast distribution system, according to a disclosed embodiment. A software repository system 1600 couples to a mixer/multiplexing unit 1602 for combing the software content with a number of television (TV) channels 1604. The output signal of the mixer/multiplexing unit 1602 is fed to a transmitter 1606 for transmitting the signal to a receiving device 1608. The transmission path may be via antenna 1610, or other commonly known broadcast technologies, e.g., cable television. The receiver 1608 is placed in a subscriber's home such that the subscriber receives the broadcast signals into his or her home or business. In addition to transmitting analog broadcast signals, the broadcast transmission system may also be capable of transmitting digital signals for use with high-definition TV, utilizing channels that facilitate high digital transmission rates.

The received signals at the output of the receiver 1608 are input to a channel selector unit 1611 which may be part of the receiver 1608 or a separate chassis. The channel selector unit 1611 provides the function of allowing the subscriber to select from Hone or more channels (1, 2, 3, . . . , N) provided by the broadcast system. The selector unit 1611 has a multi-channel output TV 1612 which connects to the subscriber's TV, and a multi-channel software output 1614 which connects to a channel "listening" interface 1616, for the filtering of selected software channels for software distributions. The listening interface 1616 receives commands from a controller 1618 which is programmed with a programmer module 1620 by the subscriber with several parameters, one of which is time of the availability of the desired software on the broadcast channel. The programmable module 1620 can be a remote control unit used like conventional remote control units for programming a video tape recorder (VTR) and a cable box.

The listening interface 1616 is operable to monitor all data traffic carried on any of the software distribution channels. The provider broadcasts selected software distributions over the respective software channels for all interested subscribers to download. The disclosed architecture simply provides broadcasting of the software distributions on a regular basis and the subscriber selects the desired download(s). There is no interaction (or confirmation) required from the subscriber to the provider prior to obtaining the desired download(s). Conventional digital pay-per-view systems operate in a number of different ways. One method is to allow the subscriber to select the program of choice along with a personal authorization code. The personal authorization code is then transmitted to the provider prior to allowing the subscriber to view the program, which program is broadcast once per specific time period. Another conventional method is offered where the subscriber enters the same program and personal code information, but upload of this information is performed on a daily or monthly basis to the provider from the cable box so that the proper charges can be made and billed to the subscriber. This upload can be through the cable medium for a two-way system, or it can utilize a telephone connection in a dial-up mode.

Individual software distributions which have been broadcast at the source are uniquely identified with header information comprising at least a unique ID. Therefore, a subscriber which selects a particular software distribution for download, inputs the respective unique ID into the programmer 1620. Other parameters entered can include the date the software will be broadcast, the time of the day when it will be broadcast, and the particular channel on which it will be available for download.

After filtering the selected software distribution for download, the selected data is stored on a storage device 1622. The storage device 1622 may be any of a number of architectures commonly used for storing software distributions. For example, the storage device 1622 can be a removable hard drive which engages the set-top receiver box, and can be removed for compatible insertion into a subscriber's computer 1624. Alternatively, the user PC 1624 can connect directly to the storage device 1622 via the controller 1618 over a communication link 1626 for transfer of the downloaded software. The communication link 1626 between the computer 1624 and the set-top box is a high speed link such as a universal serial bus (USB) or a high-performance serial bus (IEEE 1394-type). The storage device 1622 can also consist of memory (e.g., a RAM drive) for accommodating the high speed downloads provided by the TV broadcast system. Once the download has completed, a flag is set such that the user system no longer initiates a download of the currently stored software. Alternatively, the user can program the system to store everything broadcast on that channel during a specific time period and forego the selection process of choosing only selected software distributions for download. The subscriber is then charged accordingly. The download capabilities for obtaining the desired software operate in the background in that the user may view a TV program on a first channel while the software distribution download process occurs on a second channel. The controller 1618 also incorporates an error-checking feature which ensures that the downloaded software arrives free of errors.

The programmer 1620 connects to a validation and accounting unit 1628 for recording and transmitting of the selected software ID and subscriber information to the provider for billing. The validation and accounting unit 1628 transmits accounting information to a provider accounting system 1630 via one or more links, one of which utilizes a secure public-switched telephone network (PSTN). A PSTN interface unit 1634 provides the interface from the validation and accounting unit 1628 to the PSTN 1632. The PSTN interface 1634 may be a modem or any other interface device commonly used to interface to the PSTN 1632. A corresponding PSTN interface unit 1636 provides a similar interfacing function of the provider accounting system 1630 to the PSTN 1632. Alternatively, the validation and accounting unit 1628 interfaces to the provider accounting system 1630 through an unsecure packet-switched global communication network (GCN) 1638. GCN interfaces 1640 and 1642 provide the interfacing functions for the respective subscriber and provider accounting systems 1628 and 1630.

It can be appreciated that, for the most part, programming for download of the software is very similar to the conventional programming procedures required for recording a TV program using a conventional VTR machine. The subscriber becomes aware of a particular software distribution by, for example, either viewing a weekly magazine or viewing a particular channel for upcoming software distributions. The basic parameters associated with each of the software distributions comprise the unique ID, time, date, and channel. Other parameters may be provided to enhance the download process for the subscriber, such as whether to enable or disable error checking, whether the download is to be used as a demonstration package (demo) for a fixed trial period, whether the billing should be through the subscriber's pay-TV provider or perhaps directly from a charge card, etc. Note that all of the components; the receiver 1608, channel selector unit 1611, listening interface 1616, controller 1618, programmer 1620, validation and accounting unit 1628, storage device 1622, and interfaces 1634 (and/or 1640) may be incorporated into one chassis.

Referring now to FIG. 17, there is illustrated a flowchart of the process for downloading selected software distributions. Flow begins at a Start block and moves to a function block 1700 where a listening interface 1616 monitors the software data stream on one or more designated software distribution channels of the channel selector unit 1611. Flow is then to a decision block 1702 where a determination is made as to whether a filter command has been received from the controller 1618. If not, flow is out the "N" path and loops back to the input of function block 1700 to continue monitoring the software data stream. If a filter command has been received from the controller 1618, as programmed by the user, flow is out the "Y" path to function block 1704 where command switches associated with the filter command are read. For example, command switches comprise the date, time, unique ID, and channel that the listening interface 1616 is programmed to monitor. If the user wants the listening interface 1616 to switch to a particular channel of the channel selector 1618, the channel selector 1618 provides this information to the listening interface 1616. Flow is then to a function block 1706 where the listening interface 1616 then filters the desired software information from the software distribution data provided on the software distribution channel. The selected software distribution data is then downloaded and stored on the storage device 1622, as indicated by a function block 1708.

Flow is to a decision block 1710 where an error detection algorithm determines if the downloaded software has been received error-free. This is an important function since flawed software files will not run properly on the user computer 1624. If the downloaded software has errors, flow is out the "N" path to a function block 1712 where a signal is sent to the listening device 1616 from the controller 1618 to download that particular software again. In that the bandwidth of the disclosed architecture is high, this process will cause little delay from the perspective of the user. If the downloaded software is error-free, flow is out the "Y" path of decision block 1710 to a function block 1714 where the unique software ID is transmitted to the software provider from the validation and accounting unit 1628 for accounting and billing purposes. Flow is then to a function block 1716 where the channel provider then bills the customer through normal subscriber billing and payment mechanisms. The process then ends at a Stop block.

It can be appreciated that the disclosed architecture can be implemented over a the GCN 1638 using "webcasting." Webcasting is the convergence of broadcasting with a packet-switched regime. Using a PC as a broadcast medium is coming into its own with advances in packet-switched broadcasting. Multicasting is a form of webcasting which involves the simultaneous transmission of traffic to a designated subnet of users, rather than sending a separate stream of packets to each intended user (unicasting) or transmitting all packets to everyone (broadcasting). The recipient is simply instructing the computer's network interface card to listen to a particular IP address for the multicast. In other words, multiple copies of data are not sent across the network, and data is not sent to clients who do not request it. Therefore, a software provider can multicast particular applications at selected times to only those users (or subscribers) that request it.

Multicasting is like a push model of communication, i.e., radio or television, where those who want to receive the multicast tune their sets to the station they want to receive. Therefore, multicasts are announced in advance so that clients know when a multicast is available. A certain protocol supplies clients with all of the information needed to receive a multicast including its name, description, the time it is active, the media type (audio, video, text, etc.) that it uses, and the IP addresses, ports, and protocol it uses. The announcement information is multicast to a well-known IP address and port where clients running a session directory tool receive this information. To signal that a client wants to receive a multicast, the client joins a group to whom the multicast is directed. The client can join or leave the group at any time.

Referring now to FIG. 18, there is illustrated a diagrammatic view of the transmission stream for the software. As described hereinabove, a software vendor is provided with the capability of transmitting a large amount of software in a continuous manner over a dedicated software channel. Due to the high data rate associated with a digital transmission channel and the associated bandwidth, large software packages can be transmitted. Typically, a software package can consist of a multiplicity of files, all of which define a given software package. For example, a software vendor may want to provide to a potential user a complete copy of their software package including a digitized copy of the user's manual. Since software packages vary in size due to the complexity of the software, the number of files associated therewith and, the amount of graphics associated therewith, each of these packages can be of differing lengths. Some packages can be upwards of 500 Megabytes or as little as two Megabytes. The software vendor may wish to view the transfer of the software as a billing transaction wherein an account is debited upon download of the software, or the software may be provided cost-free for a predetermined length of time, as on a trial basis. However, although each user potentially receives all information on their channel due to the fact that this is a broadcast on the channel, the system will ensure that not every user is able to download the software and, when they do download the software, this constitutes some type of transaction, either for billing purposes or for database update purposes at the vendor.

As illustrated in FIG. 18, there are provided a sequence of three software packages that are transmitted. The first is Software A, the second is Software B, and the third is Software C. Software A has associated therewith a header 1802, a body 1804 and a trailer 1806. The header 1802 is operable to provide information as to what software follows, i.e., the body of Software A, the size of the file and various overhead information required for the system to receive the software. Following the header A 1802 is the body 1804 of Software A, which constitutes all of the files contained therein. At the end of the software transmission, there is provided a trailer 1806, which basically indicates to the system that all files associated with Software A have been received. Typically, this will have some error checking/correction associated therewith to ensure that the software has been completely received.

Once the Software A package has been transmitted, comprised of the header 1802, the body 1804 and the trailer 1806, then a second package, a Software B package, is transmitted. This is comprised of a header 1808, a body 1810 and a trailer 1812. This Software B package is illustrated as being smaller than the Software A package, it being understood that each software package has a length defined by the software itself and independent of the other software packages. Once the Software B package has been transmitted, then a Software C package is transmitted, comprised of a header 1814, a body 1816 and a trailer 1818. It is noted that the Software C package is considerably larger than the Software A or the Software B package. This is important to the user, since the transfer of even large software packages is relatively fast. For example, if the communication channel could transmit at 1 Megabyte/second, then a 100 Megabyte file could be transmitted in slightly over one and one-half minutes. Smaller packages would take a fraction of a minute, this being the case with some update packages. However, utilizing conventional dial-up modems and transmitting over the global communication network 1638, these transfer rates can be as low as 4 Kilobytes/second.

In this illustrated example, there are only provided three software packages transmitted in sequence. Once the Software C package has been transmitted, then the Software A package is immediately re-transmitted, again comprised of the header 1802, body 1804 and trailer 1806. This will continue for a period of time. The reason for this is that, if an error occurs in receiving a package due to the error checking algorithm, then the transaction can be noted as being incomplete and merely waits for the next broadcast of the software to again attempt an error-free download operation. It is noted that this entire operation is completed without actually sending a request to the software vendor to process the software. However, it may be that a user would request a specialized piece of software from a particular vendor. If this vendor were allocated a certain amount of time on the software channel, such as from 9 p.m. to 9:15 p.m. on one day of the week, the software vendor may indicate to a user that the software will be placed on the software channel during that time period. The user need only ensure that the system is listening to the software channel at that time. Of course, the listening interface 1616 could always be active, since it will only download the software when it recognizes the presence thereof. It is noted that the software will be available for only a short period of time.

Figure 19:
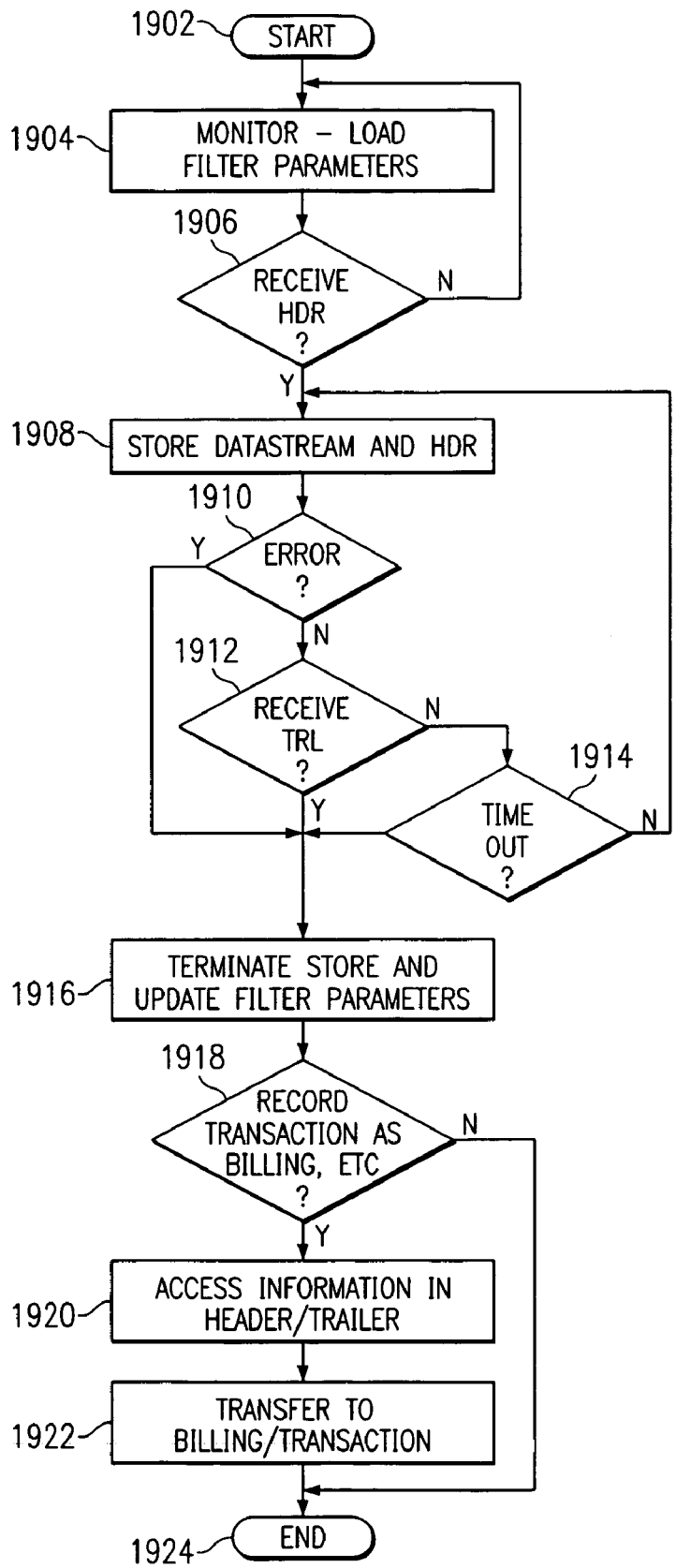
FIG. 19 illustrates a flowchart depicting the operation of examining the transmission link for software.

Referring now to FIG. 19, there is illustrated a flowchart depicting the operation of downloading the software from the broadcast stream of FIG. 18. The program is initiated at a Start block 1902 and then proceeds to a function block 1904 wherein the monitoring operation of listening device 1616 is implemented. In this block 1904, it is noted that various filter parameters are loaded, i.e., the information required to determine which software is to be examined. It is noted that all of the software will not be downloaded. This is primarily for the reason of ensuring that certain software packages are not available to a user without eliciting some type of billing transaction or operation, or that there is not some type of authorization code required. In addition, there is only a finite amount of storage space available.

Once the filter parameters have been loaded, the listening device 1616 will monitor the software stream on a continuous basis, or during a period of time that the user desires to do such. For example, the user may have a removable storage device that is not loaded into the system and, therefore, would not want to download software without the ability to store this information. A decision block 1906 is operable to determine if the header of the desired software associated with the defined filter parameters has been received. If not, the program will continue back to the input of function block 1904 along an "N" path until the header for the desired software package is received. Once received, the program will flow along a. "Y" path to a function block 1908 to initiate storage of the received data stream associated with the body of the software package within some type of storage, either on a hard disk or in another storage medium. It is indicated that the header is also stored, as the header may contain information as to billing, authorization codes, etc. However, this could also be contained within the trailer and only the body would be stored.

The program, during downloading thereof, as associated therewith some type of error checking, this typically being associated with any type of digital transmission channel. If an error is noted, as indicated by a function block 1910, it is possible to perform some type of error correction. If the error cannot be corrected, this would be a fatal error and the program would exit along a "Y" path. As long as no uncorrectable errors were detected, then the program will flow along an "N" path to a decision block 1912 to determine if the trailer has been received, i.e., whether the entire body of the software package has been received. If not, the program will flow along "N" path to a decision block 1914 to determine if a timeout operation has occurred. If so, the program will flow along a "Y" path. If not, the program will flow along an "N" path back to the input of function block 1908 to continue downloading the body of the data. Once the trailer has been received, or an error has been detected, or a timeout operation has been detected, the program will flow to a function block 1916 to terminate the storage operation and update the filter parameters. This updating operation of the filter parameters is one wherein it is noted that the desired software has been downloaded. This is necessary to ensure that it does not again receive the software and write over the already received software, which would require some type of write-over capability. Of course, this would not be necessary. Further, it may be that the filter parameters have some type of authorization code that allow the storage operation to be initiated. Once the software package has been downloaded, the program would indicate such, delete the authorization code and prevent further download of the software package at another time. Additionally, updating of the filter parameters indicates to the system that the software package has been successfully downloaded and, therefore, a billing transaction or some other database update action needs to be taken.

After the filter parameters have been updated, the program will flow to a decision block 1918 to determine if the transaction needs to be recorded as billing, etc. If this is a transaction which is required to be billed, it will be noted as such and the information forwarded to either some type of central clearinghouse or to a memory location for later downloading to a central clearinghouse. This is very similar, as described hereinabove, to digital T.V. networks, wherein access to a given channel at a defined time will trigger a billing event that is stored and later retrieved such that the user can be billed for a pay-for-view program. Further, it may be that the vendor, once the package has been downloaded to a particular user, would require some information as to what user downloaded the information. In the system, there could be provided a profile of the user, which profile is provided to a vendor at a later time. The information that would be transferred to the vendor would be information from the header indicating the software that was downloaded, the user's profile and the time of download. This could be placed in the vendor's database for purposes of later update information and notifications to the user.

Once it has been determined that the transaction must be recorded as a billing transaction, an update transaction, etc., the program will flow along a "Y" path from the decision block 1918 to a function block 1920 to access the information in the header and/or trailer of the downloaded software package. This will provide information as to the software package that was downloaded, any authorization codes required, etc. This will be then transferred to the billing/transaction package to handle all billing aspects thereof, as indicated in a function block 1922. The program will then flow to an End block 1924. If there is no recording transaction required, i.e., the software package is provided for the purpose of a defined period of time for review or it is actually a free software package, as a number of software packages are, the program will flow from the decision block 1918 along a "N" path to the End block 1924.

Figure 20:
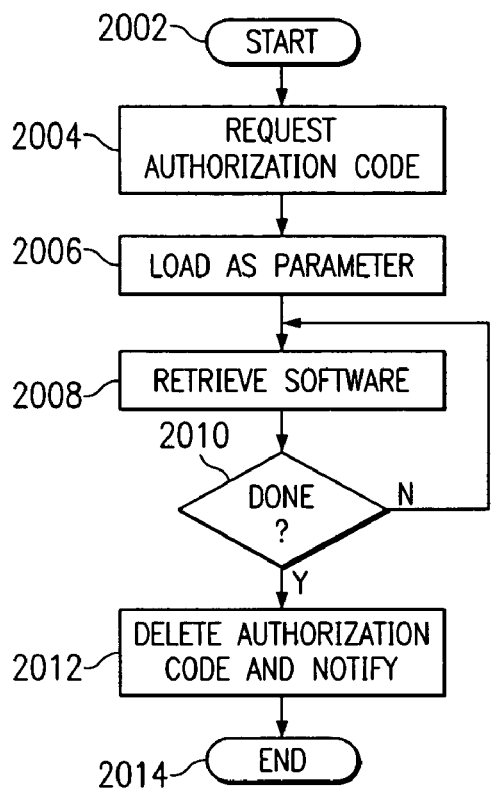
FIG. 20 illustrates a flowchart depicting the operation of requesting an authorization code.

Referring now to FIG. 20, there is illustrated a flowchart depicting the operation of utilizing an authorization code, which is initiated at a block 2002 and proceeds to a function block 2004 to request an authorization code. In this operation, a user accesses a vendor through many different medium, for example, through a telephone call, through a magazine advertisement or through the global communication network. The user could receive an authorization code for a given software package that would be for review purposes only, as a promotion or as a result of purchasing the software package through some external financial transaction. Once the authorization code is received, this will allow the user to receive the software package. Once the authorization code is input to the system, this will constitute a parameter, as indicated by a function block 2006. The system will then proceed as indicated hereinabove with respect to FIG. 19, wherein the software package will be retrieved, as indicated in function block 2008.

The program will then flow to a function block 2010 to determine if the software package has been retrieved, this noted by the function blocks 1906 through 1916. Once completed, the program will flow along a "Y" path to a function block 2012 to effectively delete the authorization code from the system and then notify the software vendor that this has been received. The reason for this is that the authorization code is associated with the user and can only be utilized for a single download. To ensure that only this user can receive this download, the authorization code may be associated with a user ID which is built into the downloading system. Therefore, the header of the software would include therein an authorization code in combination with the user ID. The system would then compare this header requiring both the authorization code and the user ID to be transmitted, such that a comparison may be made internal to the system in the listing interface 1616 and, only upon a match for both the authorization code and the user ID in the header with the authorization code input by the user as a parameter and the built in ID in the system would allow such a download. This would prevent another user accessing the software with the same code.

Alternatively, upon download, there could be an immediate notification to the software provider to not transfer the software package again with that authorization code. Note the advantage of such a system is that a large group of users could be provided with the same authorization code with the internal ID of each system allowing discrimination between each one of the users. For example, the header could have associated therewith a defined authorization code with a plurality of user IDs associated therewith. Each system that receives the software, this being all of the systems that are tuned to the channel in a broadcast system, would examine each header that is received, and if the header constitutes the desired software, has associated therewith the approved authorization code and has associated therewith the associated user ID of the receiving system, this will constitute a match and allow downloading of the software package. This will allow a software vendor to merely update the software parameters in the outgoing data stream. This may take a certain period of time to update the data stream, but this is inconsequential due to the fact that the user merely enters the authorization code and, when the software package is noted by the listening interface 1616 as being present with the appropriate software header, authorization code and/or user ID embedded therein, the software package will be downloaded. Once the authorization code has been deleted and the notification performed or the transaction completed, the program will flow to an End block 2014.

Figure 21:
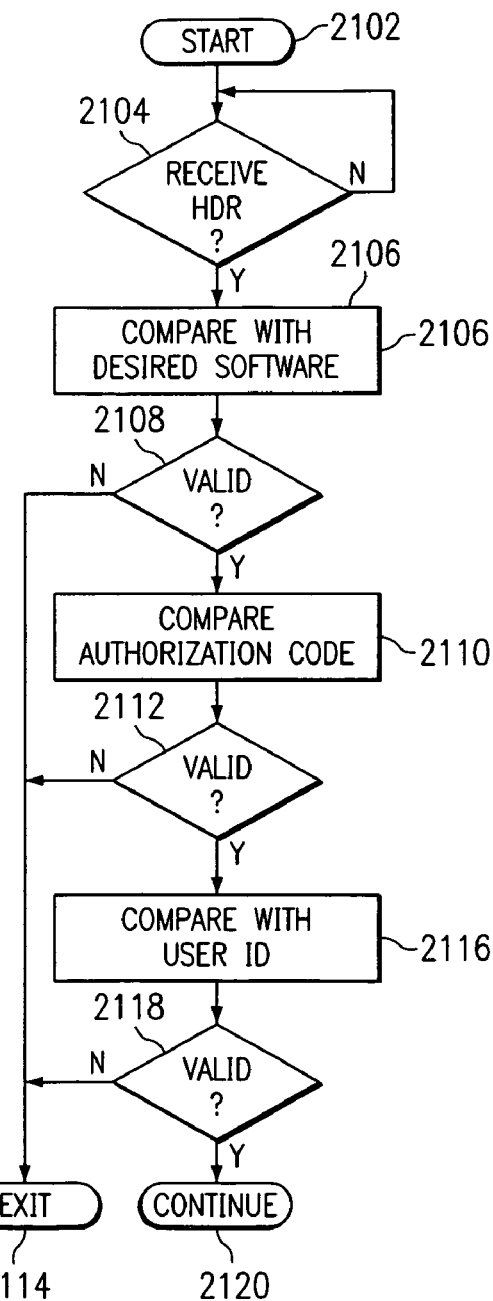
FIG. 21 illustrates the operation of deleting the authorization code once received.

Referring now to FIG. 21, there is illustrated a flowchart depicting the operation of reviewing the header that is received, this corresponding to the decision block 1906 through to the decision block 1918. The program is initiated at a start block 2102 and then proceeds to a decision block 2104 to determine if the appropriate header has been received. This header indicates that a software package has been received and, if so, then the program will flow to a function block 2106 to compare the header with the desired software that is received. If the package being transmitted is that associated with the desired software package, the program will determine this at a decision block 2108 and proceed along the "Y" path therefrom to a function block 2110 to compare the information in the header with the authorization code that is stored as a part of the parameters. The program will flow to a decision block 2112 to determine if the authorization code is a valid authorization code. If not, the program will flow to an Exit block 2114 and, if it is valid, the program will flow along a "Y" path to a function block 2116 to compare in the information in the header with the user ID in the system. As described hereinabove, this is an option wherein both the desired software, the authorization code and the user ID must be present in order for the software to be downloaded. The validity of the user ID will be determined at a decision block 2118. If it is not valid, the program will exit to block 2114 and, if valid, the program will flow to a block 2120 wherein the program will continue to the function block 1908 in FIG. 19.

Figure 22:
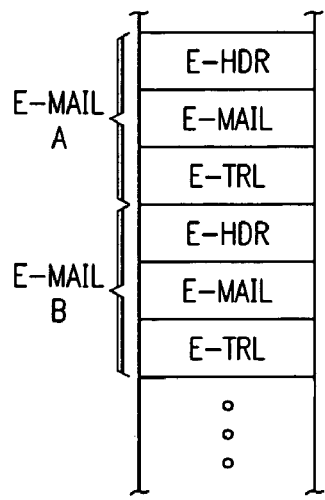
FIG. 22 illustrates the operation wherein E-Mail is transmitted on the data channel.

Referring now to FIG. 22, there is illustrated an alternate embodiment wherein information such as an E-Mail is transmitted. In this operation, the data channel is utilized by particular Internet Service Providers to transmit bulk E-Mail at desired times, if not continuously. A user can retrieve this E-Mail merely by examining the passing stream. Note that this is has some similarities to a paging system, wherein all paging receivers in a system receive every page that are transmitted to the system and only stores the pages associated therewith. This is facilitated by examining the address of each page that is received, matching it to the paging receiver address and then storing the information if there is a match. This is in accordance with a predetermined protocol referred to as POCSAG.

Each E-Mail illustrated in FIG. 22 will be associated with a header, a body and a trailer. The header will have certain information as to a user address, a password and the such. This password may be encrypted. It is important that there be some type of password for security purposes such that a secure receiving system can receive the information, and access to that secure receiving system only allowed through use of a password.

Figure 23:
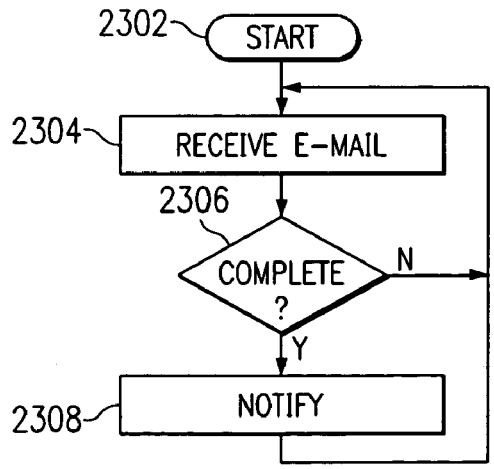
FIG. 23 illustrates a flowchart for the E-Mail operation.

Referring now to FIG. 23, there is illustrated a flowchart depicting the operation of receiving E-Mails, which is initiated at a start block 2302. The program flows to a function block 2304 to receive E-Mail. This operation, as described hereinabove, requires an examination of the address, matching it to an internal address in the parameter information and downloading thereof. There could actually be a loaded-in password that the user could place into the system that allows the E-Mail to be validated as it is being received. However, it could be that the E-Mail is stored and not actually validated as being received until the user inputs the password. This validation would constitute a receipt of the E-Mail. Once validation is complete, as indicated by decision block 2306, due to the receipt of the associated trailer or input password, the program will flow to a function block 2308 to provide a notification operation. This notification operation is necessary to indicate to the provider of the E-Mail that the information has been received. This information is received only upon a valid password being input thereto. Of course, there will be some latency in this operation because this notification may only be transmitted once a day or once an hour. It could, of course, be transmitted concurrent with input of the password. The use of a secure system for receiving information from a secure channel would facilitate such an operation.

In summary, there is provided a software distribution system which uses a conventional broadcast TV system where selected software distributions are broadcast for subscriber download over selected broadcast channels on a periodic basis. The subscriber programs a receiver box with parameters comprising channel, time, software ID, and date information locating and identifying the desired software download. A local storage device receives and stores the software distribution for transfer at a later time. The receiver connects to the provider to transmit accounting and billing information corresponding to the downloaded software. The subscriber is then billed using standard pay-TV subscriber billing systems.

Although the preferred embodiment has been described in detail, it should be understood that various changes, substitutions and alterations can be made therein without departing from the spirit and scope of the invention as defined by the appended claims.

What is claimed is:

1. A method for distributing software, comprising the steps of:
providing a television broadcast distribution system having one or more broadcast channels for broadcasting analog and digital television information to a receiver of a user;
designating select ones of the one or more broadcast channels for the transmission of one or more discrete software data streams;
transmitting the one or more discrete software data streams over the select ones of the one or more broadcast channels at a scheduled time, each of the one or more discrete software data streams having a unique ID associated therewith, which unique ID for each of the one or more discrete software streams is associated therewith by an associated software vendor and each of the unique IDs is unique to a user;
the user associating with a monitoring interface of the user that is connected to the receiver, the unique ID associated with that user and a desired one of the one or more discrete software streams;
selecting, in the monitoring interface associated with the user, selected ones of the one or more discrete software data streams according to the respective unique IDs for download via the receiver;
downloading the selected one or more discrete software data streams to a user storage device during the scheduled time for use by the user, the user storage device connected to the receiver through said monitoring interface; and
deleting the unique ID from the monitoring interface for each of the one or more discrete software data streams downloaded after downloading thereof.

2. The method of claim 1, wherein the television broadcast distribution system is a cable television broadcast system.

3. The method of claim 1, further comprising an error checking step during the step of downloading such that the one or more software data streams which are downloaded are checked for errors during the download process.

4. The method of claim 3, wherein the receiver automatically re-selects for download, and downloads, the one or more software data streams which fail the step of error checking.

5. The method of claim 1, wherein the step of broadcasting broadcasts the one or more software data streams repetitively during a specific period of time.

6. The method of claim 1, wherein the step of broadcasting broadcasts the one or more software data streams once during a specific time period.

7. The method of claim 1, further comprising a step of accounting which logs the unique IDs of the one or more software data streams which were downloaded with an accounting device, and transmits the unique IDs to a provider of the one or more software data streams using the accounting device.

8. The method of claim 7, wherein the accounting device interfaces to a public-switched telephone network, and transmits the unique IDs over the public-switched telephone network to the provider of the one or more software data streams.

9. The method of claim 7, wherein the accounting device interfaces to a packet-switched global communication network, and transmits the unique IDs over the global communication network to the provider of the one or more software data streams.

10. The method of claim 1, wherein the step of selecting further comprises the step of programming the receiver with time, channel, and the unique ID information.

11. The method of claim 1, wherein the one or more software data streams comprise software applications which are broadcast on a first channel, and one or more software updates which are broadcast on a second channel.

12. The method of claim 1, wherein the step of downloading downloads the selects ones of the one or more software data streams directly to a user computer over a communication link existing between the receiver and the user computer.

13. The method of claim 12, wherein the communication link is a universal serial bus.

14. The method of claim 12, wherein the communication link is a high-performance serial bus.

15. The method of claim 1, wherein the television broadcast distribution system is a digital television broadcast system.

16. A system for distributing software, comprising:
a television broadcast distribution system having one or more broadcast channels for broadcasting analog and digital television information to a receiver of a user;
one or more discrete software data streams designated for transmission on select ones of said one or more broadcast channels, each of the one or more discrete data streams having a unique ID associated therewith, which unique ID for each of the one or more discrete software streams is associated therewith by an associated software vendor and each of the unique IDs is unique to a user; and
a user storage device associated with the user and connected to said receiver through a monitoring interface and said user storage device operable to store both one or more of the unique IDs associated with the user prior to downloading of the one or more discrete software data streams and, after downloading thereof, for storing said downloaded one or more discrete software data streams—wherein each of said unique IDs stored in said user interface is stored there by the user;
wherein said one or more discrete software data streams are transmitted over said select ones of said one or more broadcast channels at a scheduled time, each of said one or more discrete software data streams having associated therewith the associated one of said unique IDs; and
wherein said select ones of said one or more discrete software data streams are downloaded via said receiver to said monitoring interface for filtering said discrete software data streams according to said respective unique IDs, and wherein said unique ID for each of the one or more discrete software data streams downloaded deleted from the user storage device after downloading thereof.

17. The system of claim 16, wherein said television broadcast distribution system is a cable television broadcast system.

18. The system of claim 16, wherein said select ones of said one or more software data streams are checked for errors when being downloaded.

19. The system of claim 18, wherein said receiver automatically re-selects for download, and downloads, said one or more software data streams which fail the error checking process.

20. The system of claim 16, wherein said one or more software data streams are broadcast repetitively during a specific period of time.

21. The system of claim 16, where said one or more software data streams are broadcast once during a specific time period.

22. The system of claim 16, wherein an accounting device logs said unique IDs of said one or more software data streams which were downloaded, and transmits said unique IDs to a provider of said one or more software data streams using said accounting device.

23. The system of claim 22, wherein said accounting device interfaces to a public-switched telephone network, and transmits said unique IDs over said public-switched telephone network to said provider of said one or more software data streams.

24. The system of claim 22, wherein said accounting device interfaces to a packet-switched global communication network, and transmits said unique IDs over said global communication network to said provider of said one or more software data streams.

25. The system of claim 16, wherein said receiver is programmed by inputting parameters which comprise time, channel, and said unique ID information.

26. The system of claim 16, wherein said one or more software data streams comprise software applications which are broadcast on a first channel, and one or more software updates which are broadcast on a second channel.

27. The system of claim 16, wherein said select ones of said one or more software data streams are downloaded directly to a user computer over a communication link existing between said receiver and said user computer.

28. The system of claim 27, wherein said communication link is a universal serial bus.

29. The system of claim 27, wherein said communication link is a high-performance serial bus.

30. The system of claim 16, wherein said television broadcast distribution system is a digital television broadcast system.

\* \* \* \* \*